United States Patent
McClintock et al.

(10) Patent No.: US 9,778,653 B1
(45) Date of Patent: Oct. 3, 2017

(54) SYSTEMS, DEVICES AND METHODS DELIVERING ENERGY USING AN UNCREWED AUTONOMOUS VEHICLE

(71) Applicant: AMAZON TECHNOLOGIES, INC., Reno, NV (US)

(72) Inventors: Jon Arron McClintock, Seattle, WA (US); Daniel Buchmueller, Seattle, WA (US); Varadarajan Gopalakrishnan, Cupertino, CA (US); Fabian Hensel, Zurich (CH); Jesper Mikael Johansson, Redmond, WA (US); Brandon William Porter, Yarrow Point, WA (US); Andrew Jay Roths, Kenmore, WA (US)

(73) Assignee: Amazon Technologies, Inc., Reno, NV (US)

( * ) Notice: Subject to any disclaimer, the term of this patent is extended or adjusted under 35 U.S.C. 154(b) by 295 days.

(21) Appl. No.: 14/318,373

(22) Filed: Jun. 27, 2014

(51) Int. Cl.
*G01C 22/00* (2006.01)
*G05D 1/00* (2006.01)
*B60L 11/18* (2006.01)
*B67D 7/08* (2010.01)

(52) U.S. Cl.
CPC ............ *G05D 1/00* (2013.01); *B60L 11/1816* (2013.01); *B60L 11/1822* (2013.01); *B60L 11/1846* (2013.01); *B67D 7/08* (2013.01)

(58) Field of Classification Search
None
See application file for complete search history.

(56) References Cited

U.S. PATENT DOCUMENTS

| | | | |
|---|---|---|---|
| 2006/0089800 A1* | 4/2006 | Svendsen et al. ............ 701/301 |
| 2007/0168118 A1* | 7/2007 | Lappe et al. .................. 701/207 |
| 2009/0103722 A1* | 4/2009 | Anderson ............. H04L 9/0841 380/44 |
| 2010/0211340 A1* | 8/2010 | Lowenthal et al. ............ 702/63 |
| 2011/0025267 A1* | 2/2011 | Kamen et al. ................ 320/109 |
| 2013/0229153 A1* | 9/2013 | Sarkar ................. B60L 11/1809 320/130 |
| 2014/0088804 A1* | 3/2014 | Hyde et al. ..................... 701/22 |

* cited by examiner

*Primary Examiner* — Lail Kleinman
(74) *Attorney, Agent, or Firm* — Lindauer Law, PLLC

(57) ABSTRACT

Devices such as vehicles, remote sensors, and so forth consume energy during operation. Described herein are systems, devices, and methods for transferring energy from an uncrewed autonomous vehicle to a vehicle such as a car. The uncrewed autonomous vehicle may locate the vehicle at a rendezvous location, and connect with the vehicle while the vehicle moves. Once the uncrewed autonomous vehicle connects to the vehicle, the uncrewed autonomous vehicle may transfer the energy to the vehicle.

20 Claims, 10 Drawing Sheets

SYSTEMS, DEVICES AND METHODS DELIVERING ENERGY USING AN UNCREWED AUTONOMOUS VEHICLE

BACKGROUND

Various devices consume energy during operation. Energy may be stored and distributed in various forms, such as mechanical, chemical, electrical, and so forth. For example, a vehicle may operate by drawing energy from spinning flywheels, combusting hydrocarbons, drawing electric current from capacitors, and so forth. Depletion of onboard energy may render the device inoperable. Continuing the example, the vehicle may have insufficient energy onboard to reach a recharging station thus stranding the vehicle. Depletion may result in an adverse user experience.

Figure 1:
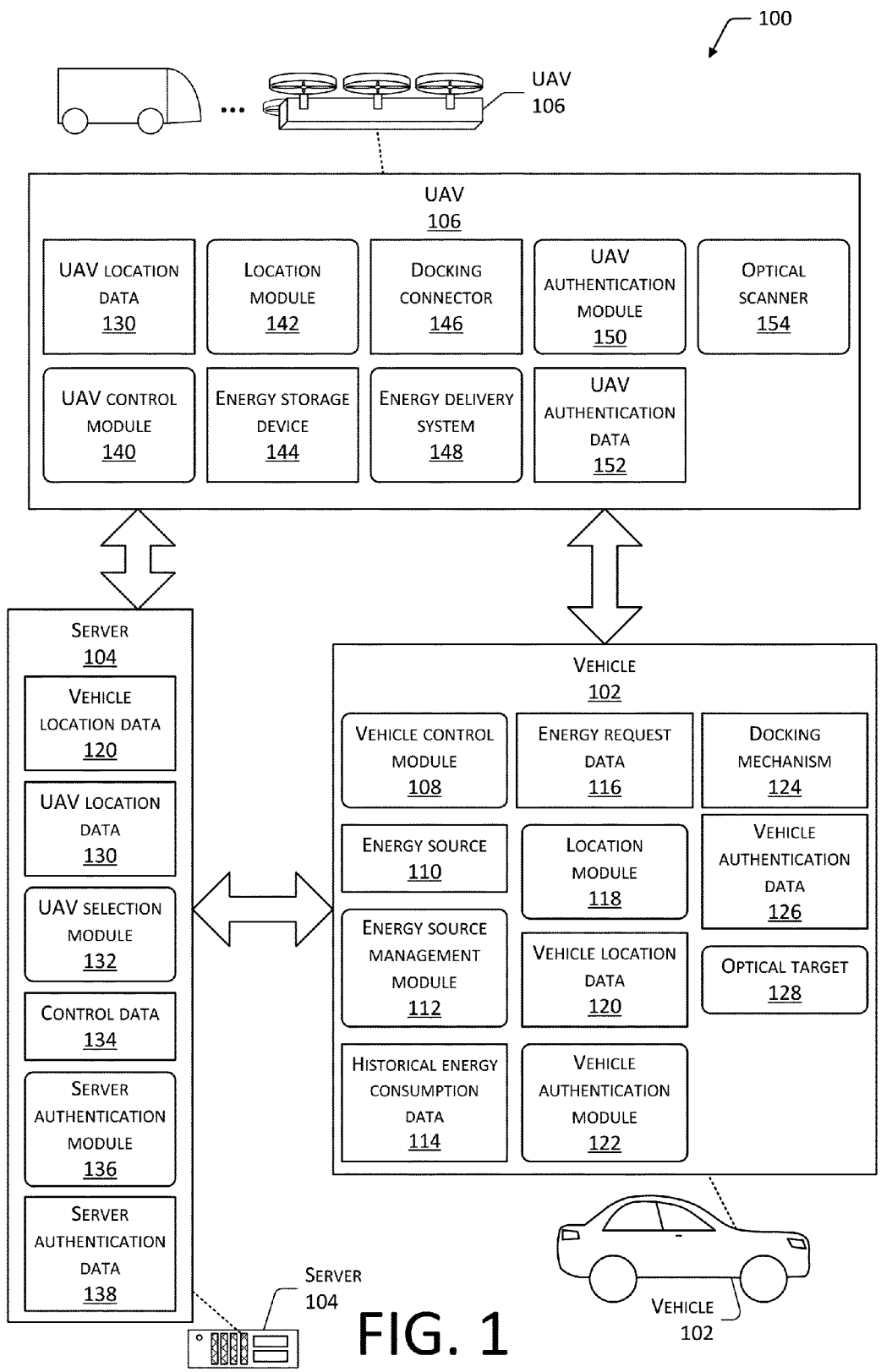
FIG. 1 is an illustrative system for providing energy to a vehicle using an uncrewed autonomous vehicle ("UAV").

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure relates to systems, devices and methods for delivering energy using an uncrewed autonomous vehicle ("UAV"). The UAV may comprise a mobile machine configured to operate in one or more autonomous or semi-autonomous modes. In a fully autonomous mode, the UAV may be configured to manage route selection, route navigation, route piloting, and so forth, without human intervention. In a semi-autonomous mode some human intervention may be utilized. For example, in a semi-autonomous mode a human operator may designate or approve a particular navigational route. The UAV may include an uncrewed ground vehicle, an uncrewed aerial vehicle, a drone, a remotely piloted aircraft, and so forth.

The UAV may transfer energy to a device. The devices which utilize energy for operation may include, without limitation, a vehicle, surveillance equipment, communications equipment, utility control equipment, and so forth. The vehicle may comprise a mobile machine that uses energy to move from one location to another. The vehicle may include a car, a truck, a bicycle, a bus, a motorcycle, a scooter, a train, a boat, a personal watercraft, an aircraft, another UAV, and so forth.

The vehicle may include an energy source that provides energy to perform processes for the vehicle. The energy source may use one or more of electric, chemical, or mechanical devices to store energy for operation of the vehicle. In one example, the energy source includes one or more batteries that supply electric energy to the vehicle. The batteries may be single use or rechargeable. During use of the vehicle, energy is drawn from the batteries. In other examples, the energy source includes fuel cells, internal combustion engines, external combustion engines, or other devices to produce energy. The devices may consume or otherwise use a reactant. The reactants may include, but are not limited to sugar, starch, alcohol, carbon monoxide, hydrogen, hydrocarbons (including gasoline, kerosene, propane, natural gas), and so forth.

The vehicle may include systems to manage the energy source of the vehicle. In some implementations, the vehicle monitors the amount of energy available from the energy source. For example, a fuel gauge may indicate a quantity of reactants remaining. The vehicle may determine whether there is a need for the vehicle to receive energy. For example, the vehicle may determine that the onboard fuel tank or battery has stored therein insufficient energy to reach a recharging station or other destination, and thus should acquire more energy. In some implementations, the vehicle generates energy request data representative of a request for energy. The vehicle may provide the energy request data to the UAV using one or more the networks discussed herein.

In some implementations, the vehicle provides the energy request to a server using one or more of the networks discussed herein. The server may be configured to select a particular UAV from a plurality of different UAVs. The server may be configured to select the particular UAV based on one or more factors. For example, the selection of the UAV may be determined based on distances between the UAVs and the vehicle, speeds of UAVs, costs associated with using the UAVs, amounts of energy available from the UAVs, docking speeds supported by the UAVs, and so forth.

Once the UAV receives instructions to transfer energy to the vehicle, the UAV may travel to a rendezvous location at which the transfer of energy may occur. The rendezvous location may include a particular location, or may include a range or area of different individual locations. In some implementations, for the UAV to meet with the vehicle, the vehicle may provide information about the location or motion of the vehicle. For example, the vehicle may provide motion information indicative of the speed of the vehicle, the direction of the vehicle, an anticipated action of the vehicle, an anticipated destination location, and so forth. The UAV may use the motion information to adjust the route to the rendezvous location.

The UAV may be configured to dock with the vehicle while the vehicle is or is not moving. For example, the rendezvous location for docking while in motion may comprise a particular length of highway which is free from overhead obstacles and relatively straight. Once the UAV docks with the vehicle, the UAV may transfer energy to the vehicle.

To prevent or reduce theft of energy or UAVs, various authentication processes may occur. In some implementations, the authentication processes may be used to confirm compatibility. For example, certain UAVs may be configured to provide only certain types of energy for certain types of vehicles. Before the UAV travels to the vehicle, and before the UAV docks with the vehicle, the UAV may request information from the vehicle to verify that the vehicle has the proper components to accept the energy. The authentication processes may also be used to confirm whether energy was transferred between the UAV and the vehicle, and may also confirm the amount of energy that was transferred between the UAV and the vehicle. In some implementations, multiple authentication techniques may be used to authenticate the participants in the energy transfer. For example, the UAV may execute a first authentication based on information acquired from an optical target. The optical target may be active such as comprising one or more lights configured to generate an optical pattern, or may be passive such as comprising a pre-printed pattern such as a target or two-dimensional barcode. The UAV may include an optical scanner configured to acquire information from the optical target. For example, as the UAV approaches the vehicle, the optical scanner may scan the optical target and determine that the optical target is generating a particular light pattern. For example, the particular light pattern may be in the shape of a circle. The UAV may determine that the targeted vehicle should include the circle shaped light pattern. Based on this determination, the UAV authenticates the vehicle.

Once the UAV docks with the vehicle, the UAV and the vehicle may be connected using a wired connection. The UAV and the vehicle may be able to provide one another with data using the wired connection. The UAV may execute a second authentication process using the wired connection. The UAV may instruct the vehicle to provide identification, and the UAV may determine whether the identification corresponds with another identification stored by the UAV. If the identifications correspond with one another, the UAV may authenticate the vehicle, resulting in the UAV accepting and processing other information from the vehicle. Other types of authentication processes are discussed below.

By providing energy using the UAV, operational uptime of devices may be improved and adverse user experiences may be reduced. For example, drivers of vehicles may eliminate or reduce the amount of times that the energy source of the vehicle will need to be configured for an increase in energy. The UAV may be configured to keep the vehicle supplied with enough energy to reach a designated destination such as a recharge station.

By using multiple authentication processes, the UAV may be protected from connecting with vehicles controlled by malicious users. The vehicles may also be protected from connecting with UAVs controlled by malicious users that may configure the UAVs to acquire private information from the vehicles. Multiple levels of authentication may be used to confirm compatibility between certain vehicles and UAVs. The authentication processes may also be used to confirm whether energy was transferred between the UAV and the vehicle, and may also confirm the amount of energy that was transferred between the UAV and the vehicle.

Illustrative System

FIG. 1 is an illustrative system 100 for delivering energy to a vehicle, using a UAV. The system 100 includes a vehicle 102, a server 104, and a UAV 106. Although FIG. 1 depicts a single vehicle 102, server 104 and UAV 106, in some implementations, the system 100 includes one or more vehicles 102, one or more servers 104, and one or more UAVs 106.

The vehicle 102 comprises a mobile machine that uses energy to move from one location to another. In some implementations, the vehicle 102 may be configured to transport people or items. The vehicle 102 may include a car, a truck, a bicycle, a bus, a motorcycle, a scooter, a train, a boat, a personal watercraft, an aircraft, and so forth. The vehicle 102 may be controlled by an operator, may operate semi-autonomously with some operator intervention, or may operate fully autonomously without operator intervention.

The UAV 106 comprises a mobile machine able to operate in one or more autonomous or semi-autonomous modes. In a fully autonomous mode, the UAV 106 may be configured to manage, without human intervention, route selection, navigation, piloting, and so forth. In a semi-autonomous mode some human intervention may be utilized. For example, in a semi-autonomous mode a human operator may designate or approve a particular navigational route. As discussed in more detail below, the UAV 106 may be configured to transport one or more items such as an energy source device. The UAV 106 may include an uncrewed ground vehicle, an uncrewed aerial vehicle, a drone, a remotely piloted aircraft, and so forth. In some implementations, the UAV 106 is configured to transport people.

The UAV 106 may be uncrewed in that there is no human operator aboard. Operation of the UAV 106 may be remotely controlled by a human operator at another location, such as in a control facility or another vehicle. In some implementations, the UAV 106 may be controlled at least in part by computers or other data processing devices at another location, such as in a datacenter.

The UAV 106 may be designed for non-military and non-law enforcement usage. For example, the UAV 106 may be configured to transport commercial cargo. For example, the UAV 106 may be configured to transport packages from a distribution center to a residential home, business, and so forth. The UAV 106 may be described as non-military and not associated with or involved with the armed forces, law enforcement, or other sovereign entities.

The UAV 106 may be constructed to be relatively light in weight and having relatively limited capabilities, compared to human-operated devices. For example, an aerial UAV 106 may have limited altitude and range, compared to a human-crewed aircraft. Continuing the example, the UAV 106 may weigh less than 45 kilograms, may be configured to fly with a maximum altitude of 3 kilometers, and may have a maximum range of 55 kilometers. In some implementations, the UAV 106 is configured to have a maximum payload weight of 9 kilograms.

The UAV 106 may be owned by or associated with merchants, customers, or commercial couriers. For example, a merchant may use the UAV 106 to deliver items that are ordered by the customer. In another example, a user may own the UAV 106 which is dispatched by the user to pickup and return items to the user's home or business.

One or more networks (not shown) facilitate communication between the one or more vehicles 102, the one or more servers 104, and the one or more UAVs 106. These networks may include a local network, a wide area network ("WAN"), broadcast network, a personal area network ("PAN"), a wired and wireless local area network ("LAN"), and so forth. In some implementations, the network includes at least one of Ethernet, Wi-Fi® as promulgated by the Wi-Fi Alliance, 3G and 4G, Bluetooth® as promulgated by the Bluetooth Special Interest Group, and so forth. In some implementations, the devices and systems described herein are configured to directly connect to each other.

In FIG. 1, the vehicle 102 includes a vehicle control module 108. The vehicle control module 108 may be configured to manage various components, devices, or systems of the vehicle 102. In one example, the vehicle 102 includes a cruise control system (not shown) that is managed by the vehicle control module 108. The vehicle control module 108 may manage the cruise control system by controlling the speed of the vehicle 102 based on inputs received from a driver of the vehicle 102. In another example, the vehicle 102 includes adaptive cruise control ("ACC") system (not shown) that is managed by the vehicle control module 108. The ACC system may be configured to perform automatic braking that allows for the vehicle 102 to travel at a designated rate and slow down when approaching other vehicles 102 or objects such that a collision is avoided. In yet another example, the vehicle control module 108 may execute an electronic stability control that improves the safety of the vehicle's stability by detecting and reducing loss of traction. In other examples, the vehicle control module 108 may manage components and systems such as advanced automatic collision notification, automatic parking, blind spot monitoring, lane departure warning system, and so forth. In some implementations, the vehicle control module 108 may manage systems and components such that the vehicle 102 operates fully autonomously or semi-autonomously.

The vehicle 102 may include an energy source 110. The energy source 110 may comprise one or more devices that provide energy to perform processes for the vehicle 102. The energy source 110 may utilize one or more of electric, chemical, or mechanical devices to store energy for operation of the vehicle 102. In one example, the energy source 110 includes one or more rechargeable batteries that supply electric energy to the vehicle 102. During use of the vehicle 102, the energy is drawn from the batteries. The batteries may then be recharged by electrical energy from a recharging station. In other examples, the energy source 110 includes fuel cells, internal combustion engines, external combustion engines, or other devices to produce energy. These devices may consume or otherwise use a reactant. The reactants may include, but are not limited to, sugar, starch, alcohol, carbon monoxide, hydrogen, hydrocarbons (including gasoline, kerosene, natural gas), and so forth. In vehicles 102 which use reactants, the energy source 110 may comprise tankage, sorbent beds, or other devices which store or accumulate the reactant for use in generating energy.

The vehicle 102 may include an energy source management module 112 configured to manage the energy source 110. For example, the energy source management module 112 may monitor the amount of energy available from the energy source 110. The energy source management module 112 may determine whether there is a need for the vehicle 102 to receive energy. In one example, the energy source management module 112 may determine that the energy source 110 has an insufficient amount of energy to reach a recharging station or other destination, and thus should acquire more energy.

The determination of whether the vehicle 102 may need energy may be based on a variety of factors. For example, the energy source management module 112 may determine that there is a need for energy based on an analysis of historical energy consumption data 114. The historical energy consumption data 114 may comprise information about an amount of energy consumed by the vehicle 102 during one or more designated periods of time, by the vehicle 102 during particular trips, by particular operators, and so forth. In one example, the historical energy consumption data 114 indicates that the vehicle 102 consumed an average of 21 kilowatts per hour while being driven the previous month. Based on this rate of energy consumption and the current amount of energy, the energy source management module 112 may determine that the energy will be depleted within 3 hours or within a certain distance (e.g., 235 kilometers). In this example, the vehicle 102 is located at a distance from a recharging station such that the vehicle 102 will need 4 hours to travel to the recharging station. In this example, without additional energy, the vehicle 102 would end up stranded. Accordingly, the energy source management module 112 determines that there is a need for energy. The historical energy consumption data 114 may be generated and stored by the energy source management module 112, may be received from other devices or systems configured to generate the historical energy consumption data 114, or a combination thereof.

The energy source management module 112 may be configured to monitor the amount of energy that is delivered to the vehicle 102 during energy transfer. The monitoring may indicate an amount of electric energy transferred (as measured in joules, coulombs, kilowatt hours, and so forth), amount of reactant transferred (as measured in liters, pascals, kilograms, and so forth), or other unit suitable for the form of energy transferred. For example, the UAV 106 may be configured to deliver 2 kilowatt hours (kWH) of energy to vehicle 102. During the delivery process, the energy source management module 112 may monitor the amount of energy that is received by the vehicle 102. The energy source management module 112 may determine whether or not the delivery of the energy occurred, and if so, how much energy was actually transferred. By monitoring the amount of energy delivered, the user of the vehicle 102 may confirm the amount of energy delivered. Data from the monitoring may be used for billing, to provide non-repudiation information for that billing, and so forth.

The energy source management module 112 may generate an energy request data 116. The energy request data 116 may comprise information indicating a request for energy. The energy source management module 112 may generate the energy request data 116 in response to a determination that there is a need for the vehicle 102 to receive energy. In FIG. 1, the vehicle 102 may provide the energy request data 116 to the server 104, a UAV 106, or other device using the network discussed above.

The vehicle 102 may include a location module 118 configured to determine the location of the vehicle 102. The location module 118 may generate vehicle location data 120 representative of the location of the vehicle 102. The vehicle location data 120 may comprise one or more of: a location of the vehicle 102 at a current time, a location of the vehicle 102 at an earlier time, a rendezvous location at which the vehicle 102 is expected to be at a future time, an expected vehicle route, or other information. For example, the vehicle location data 120 may comprise a portion of an expected vehicle route and a rendezvous location.

The UAV 106 may use the vehicle location data 120 which indicates a rendezvous location to approach the proximity of the vehicle 102 prior to delivering the requested energy. The location module 118 may generate the vehicle location data 120 based on one or more systems. These systems may include radio position finding systems, satellite-based navigation systems, inertial navigation systems, dead reckoning navigation systems, network positioning systems, tags and so forth. The satellite-based navigation system may include one or more of a Global Positioning System ("GPS") receiver, a global navigation satellite system ("GLONASS") receiver, a Galileo receiver, an Indian Regional Navigational Satellite System, and so forth.

The inertial navigation system may employ sensors such as acceleration sensors, motion sensors and rotation sensors to calculate the position of the vehicle 102 based on integration of these motions relative to a reference point. The dead reckoning navigation system may determine the location of the vehicle 102 by integrating compass headings and distance traveled by the vehicle 102 to determine displacement from a reference point. The satellite-based navigation system may use signals provided at least in part by orbital satellites to generate the location of the receiver that may be in the vehicle 102. Network positioning may involve utilizing one or more cellular network access points to determine position based at least in part on radio frequency signal strength, association of a network address or access point with a previously determined location, and so forth.

The location module 118 may also determine the location of the vehicle 102 by receiving information from one or more location tags in an environment that is indicative of the location of the vehicle 102. Location tags may include radio-frequency identification ("RFID"), optical code tags, near field communication ("NFC") tags, acoustic tags, and so forth. For example, RFID tags may be affixed to road signs.

The vehicle location data 120 may include any suitable data indicative of a location. The location may be specified in terms of latitude and longitude, grid square, street address, position relative to navigational beacons or landmarks, and so forth. For example, the location of the vehicle 102 may be specified as 48.918 North, −119.446 West, 816 Juniper Street, radial 297 distance 15.4 kilometers from CWK VORTAC, Maidenhead Grid Square DN08gw, and so forth.

The vehicle 102 may include a vehicle authentication module 122. The vehicle authentication module 122 may be configured to authenticate information received from at least one of the server 104 or the UAV 106. In one example, the server 104 is associated with a unique identifier. The vehicle authentication module 122 may query a datastore that stores one or more unique identifiers to determine whether the datastore includes the unique identifier associated with the server 104. If the unique identifier is included in the datastore, the vehicle authentication module 122 authenticates the server 104, and the vehicle 102 accepts information provided by the server 104. The vehicle authentication module 122 may authenticate the server 104 (or information provided by the server 104) based on whether the information received from the server 104 (e.g., the unique identifier) is equal to a complementary value stored by the vehicle 102.

In another example, the vehicle authentication module 122 may be configured to authenticate information received from at least one of the server 104 or the UAV 106 using symmetric key algorithms that use cryptographic keys or using asymmetric cryptography that use at least one private key and at least one public-key.

In one example, the UAV 106 is associated with a unique identifier such as a unique number. The vehicle authentication module 122 may query a datastore that stores one or more unique identifiers to determine whether the datastore includes the unique identifier associated with the UAV 106. If the unique identifier is included in the datastore, the vehicle authentication module 122 authenticates the UAV 106, and the vehicle 102 accepts information provided by the UAV 106. The vehicle authentication module 122 may authenticate the UAV 106 (or information provided by the UAV 106) based on whether the information received from the UAV 106 (e.g., the unique identifier) is equal to a complementary value stored by the vehicle 102.

The vehicle 102 may include a docking mechanism 124. The docking mechanism 124 may comprise an apparatus configured to couple to the UAV 106. The docking mechanism 124 may be integrated with the vehicle 102, or the docking mechanism 124 may comprise a separate apparatus that couples with the vehicle 102. For example, the docking mechanism 124 may be built within the body of the vehicle 102 when the vehicle 102 is manufactured, or the docking mechanism 124 may be an aftermarket mechanism that may be installed onto the vehicle 102. The docking mechanism 124 may connect to certain portions of the vehicle 102 such as the roof, a door, a trailer hitch, and so forth.

The docking mechanism 124 may include one or more connectors that couple to the UAV 106. The docking mechanism 124 may enable the vehicle 102 to receive the energy from the UAV 106. The energy source management module 112 may be configured to operate with the docking mechanism 124 to facilitate the transfer of the energy. For example, the docking mechanism 124 may include one or more moveable guiding components that are used to secure a connection with the UAV 106. The energy source management module 112 may control these moveable guiding components. The docking mechanism 124 is discussed in more detail below with regard to FIGS. 6 and 7.

The vehicle 102 may include vehicle authentication data 126. At least one of the server 104 or the UAV 106 may use the vehicle authentication data 126 to authenticate the vehicle 102. In one example, the vehicle authentication data 126 includes a unique ID associated with the vehicle 102. The vehicle authentication data 126 is discussed in more detail below with regard to FIG. 5.

The vehicle 102 may include an optical target 128 used to authenticate the vehicle 102. The optical target 128 may include one or more devices configured to generate light such as light-emitting diodes, quantum dots, electroluminescent panels, and so forth. The optical target 128 may be configured to generate light as a pattern, shape, or pattern and shape. At least one of the server 104 or the UAV 106 may authenticate the vehicle 102 based on whether the pattern or shape matches or corresponds with an expected pattern or shape. In another example, the optical target 128 may be configured to generate a particular light sequence that is used to authenticate the vehicle 102. For example, the optical target 128 may generate the following light sequence: red—red—green.

The server 104 may store UAV location data 130 comprising information about the location of one or more UAVs 106. The UAV location data 130 may include any suitable data indicative of the location of one or more UAVs 106. The UAV location data 130 and the generation of the UAV location data 130 is discussed in more detail below.

The server 104 may include a UAV selection module 132 configured to determine which UAV 106 to instruct to transfer energy to the vehicle 102. The determination may be based on a variety of factors. For example, the determination may be based on the vehicle location data 120 and UAV location data 130. An analysis of the vehicle location data 120 and the UAV location data 130 may indicate that a first UAV 106 is located closer to the vehicle 102 when compared to a distance between a second UAV 106 and the vehicle 102. Because the first UAV 106 is closer to the vehicle 102 than the second UAV 106, the UAV selection module 132 may request for the first UAV 106 to provide energy to the vehicle 102. In other examples, the selection of the UAV 106 may be determined based on speeds of UAVs 106, costs associated with using the UAVs 106, amounts of energy available from the UAVs 106, and so forth.

A particular UAV 106 may be selected based on an analysis of docking speeds supported by various UAVs 106. For example, a first UAV 106 may be configured to dock with a vehicle 102 that travels between 0 to 49 kilometers per hour, and a second UAV 106 may be configured to dock with a vehicle 102 that travels between 0 to 95 kilometers per hour. The UAV selection module 132 may acquire information about the expected route that a particular vehicle 102 will travel, and determine the speed limits associated with that route. Based on this analysis, the UAV selection module 132 selects a UAV 106 that may handle the expected speeds of travel.

The UAV selection module 132 may generate control data 134. The control data 134 may represent instructions to transfer energy to the selected UAV 106. The UAV selection module 132 may generate the control data 134 in response to receiving the energy request data 116.

The server 104 may include a server authentication module 136. The server authentication module 136 may be configured to authenticate information received from at least one of the vehicle 102 or the UAV 106. In one example, the vehicle 102 is associated with a unique identifier such as a unique number. The server authentication module 136 may query a datastore that stores one or more unique identifiers to determine whether the datastore includes the unique identifier associated with the vehicle 102. If the unique identifier is included in the datastore, the server authentication module 136 authenticates the vehicle 102, and the server 104 accepts information provided by the vehicle 102. In another example, the server authentication module 136 may authenticate the vehicle 102 (or information provided by the vehicle 102) based on whether the information received from the vehicle 102 (e.g., the unique identifier) is equal to a complementary value stored by the server 104.

In yet another example, the server authentication module 136 may be configured to authenticate information received from at least one of the vehicle 102 or the UAV 106 using symmetric key algorithms that use cryptographic keys or using asymmetric cryptography that use at least one private key and at least one public-key.

In yet another example, the UAV 106 is associated with a unique identifier such as a unique number. The server authentication module 136 may query a datastore that stores one or more unique identifiers to determine whether the datastore includes the unique identifier associated with the UAV 106. If the unique identifier is included in the datastore, the server authentication module 136 authenticates the UAV 106, and the server 104 accepts information provided by the UAV 106. The server authentication module 136 may authenticate the UAV 106 (or information provided by the UAV 106) based on whether the information received from the UAV 106 (e.g., the unique identifier) is equal to a complementary value stored by the server 104.

The server 104 may include server authentication data 138. At least one of the vehicle 102 or the UAV 106 may use the server authentication data 138 to authenticate the server 104. In one example, the server authentication data 138 includes a unique ID associated with the server 104.

The UAV 106 may include a UAV control module 140 configured to manage various components, devices or systems of the UAV 106. In the fully autonomous mode, the UAV control module 140 may be configured to manage, without human intervention, route selection, navigation, piloting, and so forth. In the semi-autonomous mode, the UAV control module 140 may be configured to enable some human intervention. For example, the UAV control module 140 may enable a human operator to designate or approve a particular navigational route. In some implementations, the UAV control module 140 is remotely controlled by a pilot on the ground or in another mobile machine.

The UAV 106 may include a location module 142 configured to determine the location of the UAV 106. The location module 142 may generate the UAV location data 130 representative of the location of the UAV 106. The UAV location data 130 may comprise one or more of: a location of the UAV 106 at a current time, a location of the UAV 106 at an earlier time, a rendezvous location at which the UAV 106 is expected to be at a future time, an expected UAV route, or other information. For example, the UAV location data 130 may comprise a portion of an expected UAV route and a rendezvous location.

The location module 142 may generate the UAV location data 130 based on one or more systems. These systems may include radio position finding systems, satellite-based navigation systems, inertial navigation systems, dead reckoning navigation systems, network positioning systems, tags and so forth. The satellite-based navigation system may include one or more of a GPS receiver, a GLONASS receiver, a Galileo receiver, an Indian Regional Navigational Satellite System, and so forth.

The inertial navigation system may employ sensors such as acceleration sensors, motion sensors and rotation sensors to calculate the position of the UAV 106 based on integration of these motions relative to a reference point. The dead reckoning navigation system may determine the location of the UAV 106 by integrating compass headings and distance traveled by the UAV 106 to determine displacement from a reference point. The satellite-based navigation system may use signals provided at least in part by orbital satellites to generate the location of the receiver that may be in the UAV 106. Network positioning may involve interrogating one or more cellular network access points to determine position based at least in part on radio frequency signal strength, association of a network address or access point with a previously determined location, and so forth.

The location module 142 may also determine the location of the UAV 106 by receiving information from one or more location tags in an environment that is indicative of the location of the UAV 106. Location tags may include RFID, optical code tags, NFC tags, acoustic tags, and so forth.

The UAV location data 130 may include any suitable data indicative of the location of the UAV 106. Locations may be specified in terms of latitude and longitude, grid square, street address, position relative to navigational beacons or landmarks, and so forth. For example, the location of the UAV 106 may be specified as 48.918 North, −119.446 West, 816 Juniper Street, radial 297 distance 15.4 kilometers from CWK VORTAC, Maidenhead Grid Square DN08gw, and so forth.

The UAV 106 may include an energy storage device 144. The energy storage device 144 is configured to store and release energy for transfer to the vehicle 102 such that the vehicle 102 may use the energy. The energy storage device 144 may store energy in one or more forms including, but not limited to: electrical, magnetic, chemical, or mechanical. In a first example, the energy storage device 144 may comprise capacitors configured to store electric energy. In a second example, the energy storage device 144 may comprise a superconductor configured to store energy as a magnetic field. In a third example, the energy storage device 144 may comprise containers such as tanks, sorbents, vessels, or other devices configured to store a fluid reactant, gaseous reactant, or solid reactant. In a fourth example, the energy storage device 144 may comprise a flywheel configured to store energy as rotational motion. In a fifth example, the energy storage device 144 may comprise a battery. The battery may comprise one or more single-use primary cells or one or more rechargeable cells. A user of the vehicle 102 may insert the battery into the vehicle 102 thereby providing additional energy to the vehicle 102. In another implementation, the battery may be automatically inserted or coupled to the vehicle 102.

In some implementations, the energy storage device 144 may include additional mechanisms to provide energy in a mechanical, electrical, pneumatic, or hydraulic form. For example, the energy storage device 144 may comprise an internal combustion engine, generator, and tankage storing diesel fuel to operate the engine. Continuing the example, during operation the engine may operate, burning the diesel fuel to produce electricity which may then be delivered to the vehicle 102.

The UAV 106 may include a docking connector 146 that is used to couple or connect the UAV 106 to the vehicle 102. The docking connector 146 may be configured to couple to the docking mechanism 124. For example, the docking connector 146 may comprise one or more arms or mechanical engagement members configured to engage a portion of the vehicle 102. The docking connector 146 is discussed in more detail with regard to FIGS. 6 and 7.

The UAV 106 may include an energy delivery system 148 comprising one or more mechanisms which control the transfer of energy between the UAV 106 and the vehicle 102. The energy delivery system 148 may operate with the docking connector 146 to transfer the energy from the UAV 106 to the vehicle 102. The energy delivery system 148 may include various mechanical and electrical components (e.g., controllers, valves, transistors, and so forth) that are configured to operate the transfer of the energy from the UAV 106 to the vehicle 102. In one example, the energy storage device 144 comprises a tank of gasoline. The energy delivery system 148 includes a first liquid transfer valve that is configured to connect with a second liquid transfer valve of the vehicle 102. The energy delivery system 148 may open and close the first liquid transfer valve to transfer the gasoline from the UAV 106 to the vehicle 102. In another example, the energy storage device 144 comprises a battery. The energy delivery system 148 includes a plurality of mechanical arms configured to hold and release the battery. In this example, once the UAV 106 is positioned over or proximate to the vehicle 102, the energy delivery system 148 may release the rechargeable battery such that the battery is transferred to the vehicle 102. A user of the vehicle 102 may insert the battery into the vehicle 102 thereby providing additional energy to the vehicle 102.

In yet another example, the energy delivery system 148 is configured to provide energy to the vehicle 102 using wireless energy transmission. The wireless energy transmission may include various techniques such as the use of electromagnetic induction or electromagnetic radiation.

The UAV 106 may include an UAV authentication module 150. The UAV authentication module 150 may be configured to authenticate information received from at least one of the vehicle 102 or the server 104. In one example, the vehicle 102 is associated with a unique identifier such as a unique number. The UAV authentication module 150 may query a datastore that stores one or more unique identifiers to determine whether the datastore includes the unique identifier associated with the vehicle 102. If the unique identifier is included in the datastore, the UAV authentication module 150 authenticates the vehicle 102, and the UAV 106 accepts information provided by the vehicle 102. In another example, the UAV authentication module 150 may authenticate the vehicle 102 (or information provided by the vehicle 102) based on whether the information received from the vehicle 102 (e.g., the unique identifier) is equal to a complementary value stored by the UAV 106.

In yet another example, the UAV authentication module 150 may be configured to authenticate information received from at least one of the vehicle 102 or the server 104 using symmetric key algorithms that use cryptographic keys or using asymmetric cryptography that use at least one private key and at least one public-key.

In one example, the server 104 is associated with a unique identifier such as a unique number. The UAV authentication module 150 may query a datastore that stores one or more unique identifiers to determine whether the datastore includes the unique identifier associated with the server 104. If the unique identifier is included in the datastore, the UAV authentication module 150 authenticates the server 104, and the UAV 106 accepts information provided by the server 104. The UAV authentication module 150 may authenticate the server 104 (or information provided by the server 104) based on whether the information received from the server 104 (e.g., the unique identifier) is equal to a complementary value stored by the UAV 106.

The UAV 106 may include UAV authentication data 152. At least one of the vehicle 102 or the server 104 may use the UAV authentication data 152 to authenticate the UAV 106. In one example, the UAV authentication data 152 includes a unique ID associated with the UAV 106. The UAV authentication data 152 is discussed in more detail below with regard to FIG. 5.

The UAV 106 may include an optical scanner 154. The optical scanner 154 may be configured to scan or read the optical target 128. In one example, the optical scanner 154 comprises a camera. The optical scanner 154 may be configured to read the light pattern being illuminated from the optical target 128. In some implementations, the optical scanner 154 is configured to read a machine-readable optical code attached to the vehicle 102. The machine-readable optical code may comprise a barcode such as a UPC or QR Code.

In some implementations, the UAV 106 is configured to transfer or deliver energy to other devices (not shown). The devices may include surveillance equipment, communications equipment, utility control equipment, and so forth. The UAV 106 may be configured to transfer energy to another UAV 106. For example, a first UAV 106 may be stranded due to an unexpected increase in energy consumption. For example, an increase in energy consumption may occur due to the first UAV 106 traveling through unexpected high winds or when an unexpected internal malfunction occurs. A second UAV 106 may be utilized to deliver energy to the stranded first UAV 106.

In some implementations, the UAV 106 is configured to provide other items (not shown) to the vehicle 102. For example, the UAV 106 may deliver items such as food, medicine, blankets, and so forth. The UAV 106 may utilize propellers, ducted fans, jets, envelopes containing a lighter-than-air gas, and so forth to achieve and maintain flight. In some implementations, the UAV 106 may include at least one of fixed wings or propellers. In one example, the UAV 106 utilizes one or more propellers to enable takeoff and landing and a fixed wing configuration or a combination wing and propeller configuration to sustain flight while the UAV 106 is airborne.

Figure 2:
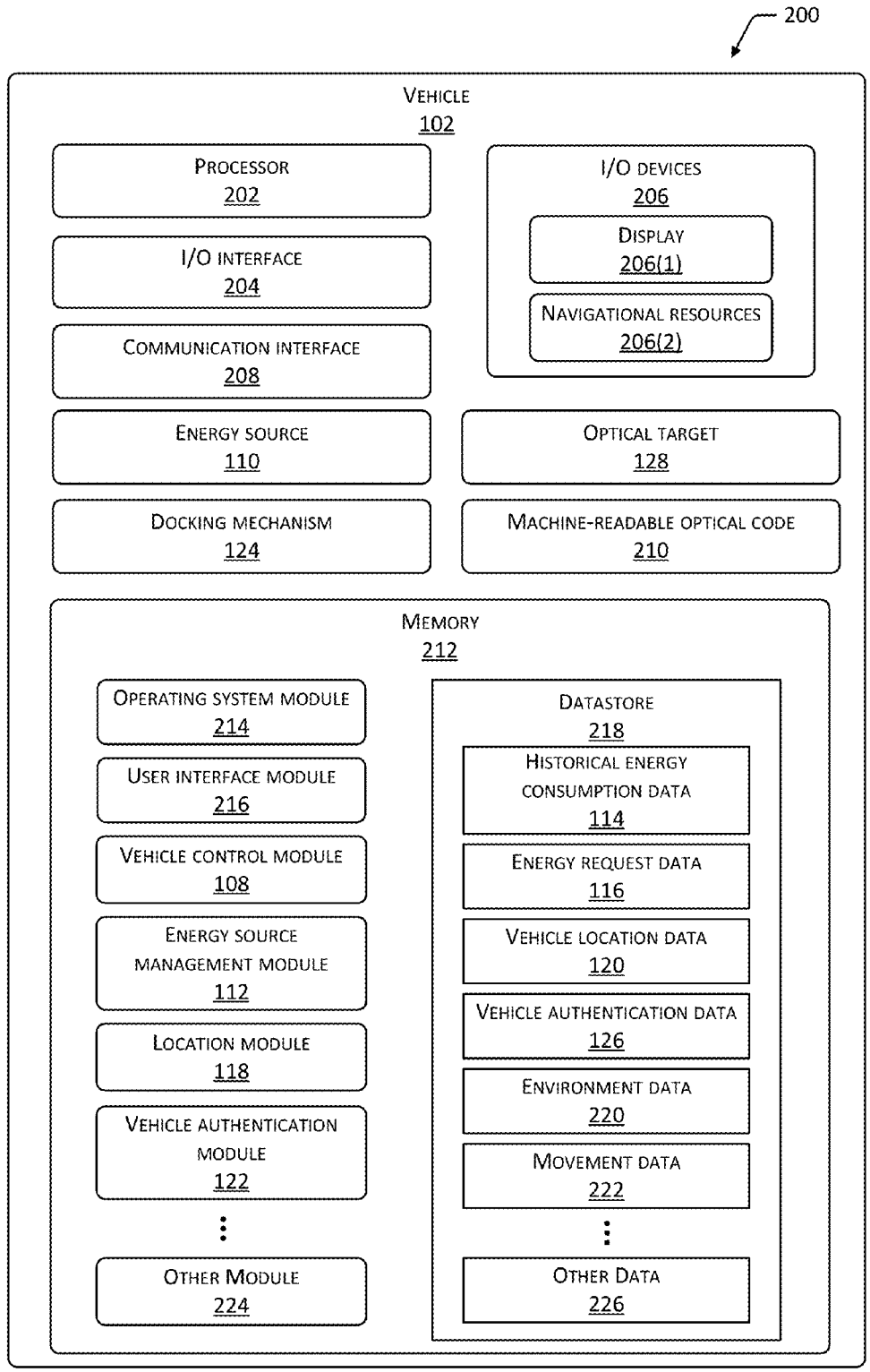
FIG. 2 is a schematic diagram of the vehicle configured to request and receive energy.

FIG. 2 is a schematic diagram 200 of the vehicle 102 configured to request and receive energy. The vehicle 102 may include at least one hardware processor 202 (or "processor") configured to execute stored instructions. The at least one hardware processor 202 may comprise one or more cores.

The vehicle 102 includes at least one input/output ("I/O") interface 204 that enables portions of the vehicle 102 (e.g., the hardware processor 202) to communicate with other devices. The I/O interface 204 may be configured to implement various protocols, such as inter-integrated circuit ("I2C"), serial peripheral interface bus ("SPI"), Universal Serial Bus ("USB"), RS-232, HDMI, TOSLINK®, Bluetooth®, and so forth.

The I/O interface 204 may couple to one or more I/O devices 206. The I/O devices 206 may include one or more input devices such as a keyboard, a mouse, a microphone, a digital camera, user input buttons, and so forth. The I/O devices 206 may also include output devices such as one or more displays 206(1), audio speakers, haptic output devices, and so forth. The I/O devices 206 may also include respective navigational resources 206(2) such as, without limitation, satellite-based navigation or positioning such as GPS or GLONASS, cellular tower-based locating, inertial navigation devices or systems, radio-based navigation receivers, dead reckoning devices, gyroscopes, odometers, compasses, accelerometers, and so on. In some embodiments, the I/O devices 206 may be physically incorporated within the vehicle 102, or they may be externally placed. The I/O devices 206 may include various other devices, as well.

The vehicle 102 may also include one or more communication interfaces 208. The communication interface 208 is configured to provide communications with other vehicles 102, web-based resources, servers 104, routers, wireless access points, network access satellites, cellular towers, and so forth. The communication interfaces 208 may include wireless functions, devices configured to couple to one or more networks including LANs, Wireless-LANs, WANs, Wireless-WANs, and so forth. In some implementations, the communication interface 208 utilizes DC-BUS technology for communicating over power lines. The DC-BUS may be implemented by at least one of signaling technology that is byte oriented or DCB technology that is message oriented. Using the DC-BUS technology, the amount of electric wires used within the vehicle 102 may be reduced, which may lower costs associated with the vehicle 102. The vehicle 102 may also include one or more busses or other internal communications hardware or software that allow for the transfer of data between the various modules and components of the vehicle 102.

The vehicle 102 may include the energy source 110. The energy source 110 may comprise one or more devices that provide energy to perform processes for the vehicle 102. The energy source 110 may utilize one or more of electric, chemical, or mechanical devices to store energy for operation of the vehicle 102. In one example, the energy source 110 includes one or more rechargeable batteries that supply electric energy to the vehicle 102. During use of the vehicle 102, the energy is drawn from the batteries. The batteries may then be recharged by electrical energy from a recharging station. In other examples, the vehicle 102 may include fuel cells, internal combustion engines, external combustion engines, or other devices to produce energy. These devices may consume or otherwise use a reactant. The reactants may include, but are not limited to, sugar, starch, alcohol, carbon monoxide, hydrogen, hydrocarbons (including gasoline, kerosene, natural gas), and so forth. In vehicles 102 which use reactants, the energy source 110 may comprise tankage, sorbent beds, or other devices which store or accumulate the reactant for use in generating energy.

The vehicle 102 may include a machine-readable optical code 210. The machine-readable optical code 210 may comprise a barcode such as a UPC or QR Code. The machine-readable optical code 210 may be used by the UAV 106 to authenticate the vehicle 102. The optical scanner 154 may scan or read the machine-readable optical code 210 and determine whether the information acquired from the machine-readable optical code 210 is equal to certain information, resulting with the vehicle 102 being authenticated.

The vehicle 102 may include the docking mechanism 124. The docking mechanism 124 may comprise an apparatus configured to couple to the UAV 106. The docking mechanism 124 may be integrated with the vehicle 102, or the docking mechanism 124 may comprise a separate apparatus that couples with the vehicle 102. For example, the docking mechanism 124 may be built within the body of the vehicle 102 when the vehicle 102 is manufactured, or the docking mechanism 124 may be an aftermarket mechanism that may be installed onto the vehicle 102. The docking mechanism 124 may connect to certain portions of the vehicle 102 such as the roof, a door, a trailer hitch, and so forth.

The docking mechanism 124 may include one or more connectors that couple to the UAV 106. The docking mechanism 124 may enable the vehicle 102 to receive the energy from the UAV 106. The energy source management module 112 may be configured to operate with the docking mechanism 124 to facilitate the transfer of the energy. For example, the docking mechanism 124 may include one or more moveable guiding components that are used to secure a connection with the UAV 106. The energy source management module 112 may control these moveable guiding components. The docking mechanism 124 is discussed in more detail below with regard to FIGS. 6 and 7.

The vehicle 102 may include the optical target 128 used to authenticate the vehicle 102. The optical target 128 may include one or more devices configured to generate light such as light-emitting diodes, quantum dots, electroluminescent panels, and so forth. The optical target 128 may be configured to generate light as a pattern or shape. At least one of the server 104 or the UAV 106 may authenticate the vehicle 102 based on whether the pattern or shape matches or corresponds with an expected pattern or shape. In another example, the optical target 128 may be configured to generate a particular light sequence that is used to authenticate the vehicle 102. For example, the optical target 128 may generate the following light sequence: red—red—green.

As illustrated in FIG. 2, the vehicle 102 may include at least one memory 212 or memory device. The memory 212 may include at least one non-transitory computer-readable storage media ("CRSM"). The CRSM may include at least one of an electronic storage medium, a magnetic storage medium, an optical storage medium, a quantum storage medium, or a mechanical computer storage medium. The memory 212 may include computer readable instructions, data structures, program modules, and other data for the operation of the vehicle 102.

The memory 212 may include at least one operating system ("OS") module 214. The OS module 214 may be configured to manage hardware resources such as the I/O interface 204, the I/O devices 206, the communication interface 208, and provide various services to applications or modules executing on the hardware processor 202. The memory 212 may also store at least one of the following modules that may be executed as foreground applications, background tasks, daemons, and so forth.

The memory 212 may include a user interface module 216 configured to provide a user interface to a user or to the vehicle 102. In one implementation, the user interface may be a web interface presented via the network and accessible to the user. In another implementation, the user interface may comprise an application programming interface ("API") that enables communication such as sending requests for items from the vehicle 102 to at least one of the server 104 or the UAV 106. The user interface may be presented using one or more output devices, such as a display 206(1) on the dashboard, haptic generator on a steering wheel, sound from a speaker, and so forth.

The memory 212 may include the vehicle control module 108. The vehicle control module 108 may be configured to manage various components, devices, or systems of the vehicle 102. In one example, the vehicle 102 includes a cruise control system (not shown) that is managed by the vehicle control module 108. The vehicle control module 108 may manage the cruise control system by controlling the speed of the vehicle 102 based on inputs received from a driver of the vehicle 102. In another example, the vehicle 102 includes adaptive cruise control ("ACC") system (not shown) that is managed by the vehicle control module 108. The ACC system may be configured to perform automatic braking that allows for the vehicle 102 to travel at a designated rate and slow down when approaching other vehicles 102 or objects such that a collision is avoided. In yet another example, the vehicle control module 108 may execute an electronic stability control that improves the safety of the vehicle's stability by detecting and reducing loss of traction. In yet other examples, the vehicle control module 108 may manage components and systems such as advanced automatic collision notification, automatic parking, blind spot monitoring, lane departure warning system, and so forth. In some implementations, the vehicle control module 108 may manage systems and components such that the vehicle 102 operates fully autonomously or semi-autonomously.

The memory 212 may include the energy source management module 112 configured to manage the energy source 110. The energy source management module 112 may monitor the amount of energy available from the energy source 110. The energy source management module 112 may determine whether there is a need for the vehicle 102 to receive energy. In one example, the energy source management module 112 may determine that the energy source 110 has insufficient energy to reach a recharging station or other destination, and thus should acquire more energy.

The determination of whether the vehicle 102 needs energy may be based on a variety of factors. For example, the energy source management module 112 may determine that there is a need for energy based on an analysis of historical energy consumption data 114. In one example, the historical energy consumption data 114 indicates that the vehicle 102 consumed an average of 21 kilowatts per hour while being driven the previous month. Based on this rate of energy consumption and the present amount of energy, the energy source management module 112 may determine that the energy will be depleted within 3 hours or within a certain distance (e.g., 235 kilometers). In this example, the vehicle 102 is located at distance from a recharging station such that the vehicle 102 will need 4 hours to travel to the recharging station. In this example, without additional energy, the vehicle 102 would end up stranded. Accordingly, the energy source management module 112 determines that there is a need for energy. The historical energy consumption data 114 may be generated and stored by the energy source management module 112, may be received from other devices or systems configured to generate the historical energy consumption data 114, or a combination thereof.

In some implementations, the historical energy consumption data 114 may be generated based on an analysis of other historical energy consumption data 114 that is associated with other similar vehicles 102. For example, a first type of automobile may be traveling with first conditions that include a particular route, particular weather, and may have a first amount of energy. The server 104 may include a datastore that includes historical energy consumption data 114 for different vehicles 102. The server 104 may compare the first conditions with the stored historical energy consumption data 114 with other similar types of automobiles and determine that a certain amount of energy is required for the vehicle 102 to reach a recharging station. The historical energy consumption data 114 may also be based on particular routes for similar types of vehicles or different types of vehicles. For example, other sedans travelling northbound on route 66 between mile marker 111 and 113 consumed 2 kilowatts of energy.

In yet another example, the energy source management module 112 may determine that there is a need for energy based on a user preference. For example, the driver of the vehicle 102 may configure the vehicle to request energy when the energy source 110 has an amount of energy that is equal to or less than a designated amount. For example, the designated amount may include an energy source 110 that has an amount equal to half full.

The energy source management module 112 may be configured to monitor the amount of energy that is delivered to the vehicle 102 during energy transfer. The monitoring may indicate an amount of electric energy transferred (as measured in coulombs, kilowatt hours, and so forth), amount of reactant transferred (as measured in liters, pascals, kilograms, and so forth), or other unit suitable for the form of energy transferred. For example, the UAV 106 may be configured to deliver 2 kilowatt hours (kWH) of energy to vehicle 102. During the delivery process, the energy source management module 112 may monitor the amount of energy that is received by the vehicle 102. The energy source management module 112 may determine whether or not the delivery of the energy occurred, and if so, how much energy was actually transferred. By monitoring the amount of energy delivered, the user of the vehicle 102 may confirm the amount of energy delivered. Data from the monitoring may be used for billing, to provide non-repudiation information for that billing, and so forth.

The energy source management module 112 may generate the energy request data 116. The energy source management module 112 may generate the energy request data 116 in response to a determination that there is a need for the vehicle 102 to receive energy. The energy source management module 112 may provide the energy request data 116 to the server 104, the UAV 106, or other device using the network discussed above.

The memory 212 may include the location module 118. The location module 118 may determine the location of the vehicle 102. The location module 118 may generate the vehicle location data 120 representative of the location of the vehicle 102. The location module 118 may generate the vehicle location data 120 based on one or more systems. These systems may include radio position finding systems, satellite-based navigation systems, inertial navigation systems, dead reckoning navigation systems, network positioning systems, tags and so forth. The satellite-based navigation system may include one or more of a GPS receiver, a GLONASS receiver, a Galileo receiver, an Indian Regional Navigational Satellite System, and so forth.

The inertial navigation system may employ sensors such as acceleration sensors, motion sensors and rotation sensors to calculate the position of the vehicle 102 based on integration of these motions relative to a reference point. The dead reckoning navigation system may determine the location of the vehicle 102 by integrating compass headings and distance traveled by the vehicle 102 to determine displacement from a reference point. The satellite-based navigation system may use signals provided at least in part by orbital satellites to generate the location of the receiver that may be in the vehicle 102. Network positioning may involve interrogating one or more cellular network access points to determine position based at least in part on radio frequency signal strength, association of a network address or access point with a previously determined location, and so forth. The location module 118 may also determine the location of the vehicle 102 by receiving information from one or more location tags in an environment that is indicative of the location of the vehicle 102. Location tags may include RFID, optical code tags, NFC tags, acoustic tags, and so forth.

The memory 212 may include the vehicle authentication module 122 that is configured to authenticate information received from at least one of the server 104 or the UAV 106. In one example, the server 104 is associated with a unique identifier such as a unique number. The vehicle authentication module 122 may query a datastore that stores one or more unique identifiers to determine whether the datastore includes the unique identifier associated with the server 104. If the unique identifier is included in the datastore, the vehicle authentication module 122 authenticates the server 104, and the vehicle 102 accepts information provided by the server 104. The vehicle authentication module 122 may authenticate the server 104 (or information provided by the server 104) based on whether the information received from the server 104 (e.g., the unique identifier) is equal to a complementary value stored by the vehicle 102.

In another example, the vehicle authentication module 122 may be configured to authenticate information received from at least one of the server 104 or the UAV 106 using symmetric key algorithms that use cryptographic keys or using asymmetric cryptography that use at least one private key and at least one public-key.

In one example, the UAV 106 is associated with a unique identifier such as a unique number. The vehicle authentication module 122 may query a datastore that stores one or more unique identifiers to determine whether the datastore includes the unique identifier associated with the UAV 106. If the unique identifier is included in the datastore, the vehicle authentication module 122 authenticates the UAV 106, and vehicle 102 accepts information provided by the UAV 106. The vehicle authentication module 122 may authenticate the UAV 106 (or information provided by the UAV 106) based on whether the information received from the UAV 106 (e.g., the unique identifier) is equal to a complementary value stored by the vehicle 102.

The vehicle authentication module 122 may be configured to authenticate at least one of the server 104 or the UAV 106 based on challenge-response authentication. For example, the vehicle 102 may require a password to be entered from at least one of the server 104 or the UAV 106 to proceed with further communications.

In some implementations, the vehicle authentication module 122 is configured to authenticate the UAV 106 based on a movement pattern associated with the UAV 106. For example, before the vehicle 102 allows for the UAV 106 to dock with the vehicle 102, the vehicle 102 may be configured to provide instructions for the UAV 106 to move in a certain pattern. For example, the movement pattern may comprise a movement such as moving up, down, left, and right. Once the vehicle 102 determines that the UAV 106 has moved in the movement pattern, the vehicle 102 may authenticate the UAV 106.

The vehicle authentication module 122 may be configured to authenticate the UAV 106 based on sound. For example, when the UAV 106 is proximate to the vehicle 102, the UAV 106 may emit a unique sound that is used by the vehicle 102 to identify the UAV 106.

In some implementations, the memory 212 includes a datastore 218 for storing information. The datastore 218 may use a flat file, database, linked list, tree, or other data structure to store the information. In some implementations, the datastore 218, or a portion thereof, may be distributed across at least one other device, such as a server, a network storage device, and so forth. As illustrated in FIG. 2, the datastore 218 may include at least one of the historical energy consumption data 114, the energy request data 116, the vehicle location data 120, the vehicle authentication data 126, environment data 220, or movement data 222. The datastore 218 may include other data 226, which may include information such as administrator preferences, account information associated with users, and so forth.

The environment data 220 may comprise information about the environment near at least one of the vehicle 102 or the UAV 106. For example, the environment data 220 may include information about how much lighting exists near the vehicle 102 or the UAV 106, the temperature near the vehicle 102 or the UAV 106, and so forth. The environment data 220 may be provided between the vehicle 102 and the UAV 106. The UAV 106 may use the environment data 220 to mobilize to the vehicle 102 and connect with the vehicle 102. The environment data 220 may be generated by one or more environment sensors.

In one example, the environment data 220 may indicate information about the type of road the vehicle 102 is currently located or travelling on. When compared to a straight road, a curvy road may cause more difficulty for the UAV 106 to connect with the vehicle 102. If the vehicle 102 is located on a curvy road, the UAV 106 may be configured to wait until the vehicle 102 leaves the curvy road before attempting to connect with the vehicle 102.

In another example, the environment data 220 may indicate information about objects near the vehicle 102. For example, the vehicle 102 may be located near overhead electrical wires or a bridge. If the vehicle 102 is located near certain objects, the UAV 106 may be configured to wait until the vehicle 102 is positioned such that the objects are further away from the vehicle 102.

The movement data 222 may represent information about the movement of the vehicle 102. The movement data 222 may indicate at least one of the following: speed of the vehicle 102; direction of the vehicle 102; an anticipated action of the vehicle 102; and a destination location of the vehicle 102. The UAV 106 may analyze the movement data 222 to adjust the rendezvous location while travelling to the vehicle 102.

The memory 218 may include one or more other modules 224. For example, a module may be configured to manage administrative preferences, account information, and so forth.

Figure 3:
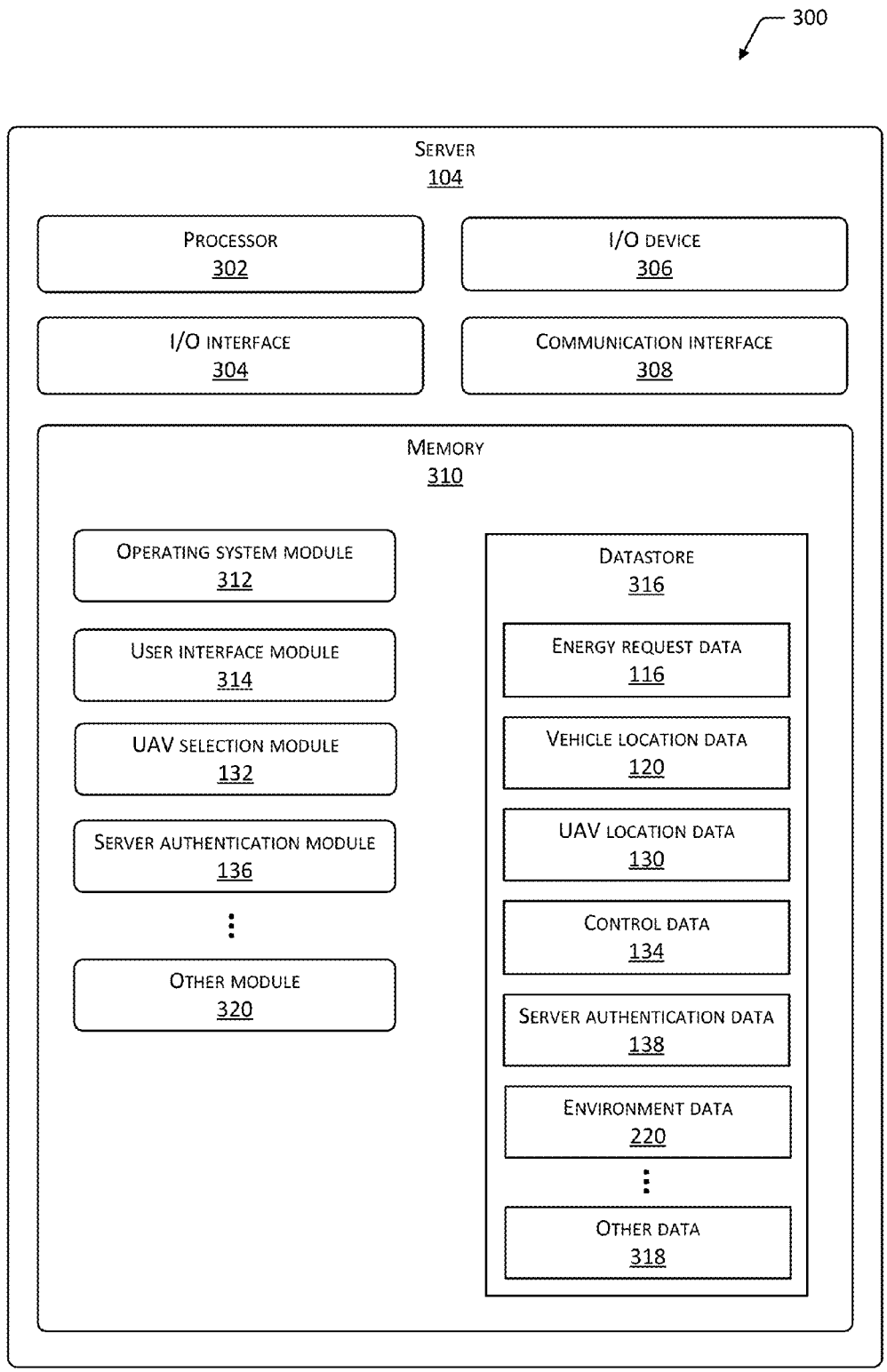
FIG. 3 is a schematic diagram of the server configured to provide instructions to a particular UAV to transfer energy to a device.

FIG. 3 is a schematic diagram 300 of the server 104 configured to provide instructions to a particular UAV 106 to transfer energy to a device. The server 104 may include at least one hardware processor 302 (or "processor") configured to execute stored instructions. The at least one hardware processor 302 may comprise one or more cores.

The server 104 includes at least one I/O interface 304 that enables portions of the server 104 (e.g., the hardware processor 302) to communicate with other devices. The I/O interface 304 may be configured to implement various protocols, such as I2C, SPI, USB, RS-232, HDMI, TOSLINK®, Bluetooth®, and so forth.

The I/O interface 304 may couple to one or more I/O devices 306. The I/O devices 306 may include one or more input devices such as a keyboard, a mouse, a microphone, a digital camera, user input buttons, and so forth. The I/O devices 306 may also include output devices such as one or more displays, audio speakers, haptic output devices, and so forth. In some embodiments, the I/O devices 306 may be physically incorporated within the server 104, or they may be externally placed. The I/O devices 306 may include various other devices, as well.

The server 104 may also include one or more communication interfaces 308. The communication interface 308 is configured to provide communications with vehicles 102, web-based resources, other servers 104, routers, wireless access points, network access satellites, cellular towers, and so forth. The communication interface 308 may include wireless functions, devices configured to couple to one or more networks including LANs, Wireless-LANs, WANs, Wireless-WANs, and so forth. The server 104 may also include one or more busses or other internal communications hardware or software that allow for the transfer of data between the various modules and components of the server 104.

As illustrated in FIG. 3, the server 104 may include at least one memory 310 or memory device. The memory 310 may include at least one non-transitory CRSM. The CRSM may include at least one of an electronic storage medium, a magnetic storage medium, an optical storage medium, a quantum storage medium, or a mechanical computer storage medium. The memory 310 may include computer readable instructions, data structures, program modules, and other data for the operation of the server 104.

The memory 310 may include at least one OS module 312. The OS module 312 may be configured to manage hardware resources such as the I/O interface 304, the I/O devices 306, the communication interface 308, and provide various services to applications or modules executing on the hardware processor 302. The memory 310 may also store at least one of the following modules that may be executed as foreground applications, background tasks, daemons, and so forth.

The memory 310 may include a user interface module 314 configured to provide a user interface to a user or to the server 104. In one implementation, the user interface may be a web interface presented via the network and accessible to the user. In another implementation, the user interface may comprise an API that enables communication such as sending requests for items from the server 104 to at least one of the vehicle 102 or the UAV 106.

The memory 310 may include the UAV selection module 132 configured to determine which UAV 106 to instruct to transfer energy to the vehicle 102. The determination may be based on a variety of factors. For example, the determination may be based on the vehicle location data 120 and UAV location data 130. An analysis of the vehicle location data 120 and the UAV location data 130 may indicate that a first UAV 106 is located closer to the vehicle 102 when compared to a distance between a second UAV 106 and the vehicle 102. Because the first UAV 106 is closer to the vehicle 102 than the second UAV 106, the UAV selection module 132 may request for the first UAV 106 to provide energy to the vehicle 102. In other examples, the selection of the UAV 106 may be determined based on speeds of UAVs 106, costs associated with using the UAVs 106, amounts of energy available from the UAVs 106, and so forth.

In some implementations, at least one of the server 104 or UAV 106 is associated with an online merchant. The UAV selection module 132 may be configured to select a particular UAV 106 to coordinate the delivery of an item (e.g., as food, medicine, blankets, and so forth). In one example, in response to receiving a request for energy from the vehicle 102, the UAV selection module 132 analyzes computing devices (e.g., mobile phones, tablets, and so forth) associated with passengers of the vehicle 102 to determine whether any of the passengers intend to pick up or have ordered any items. The UAV selection module 132 may check an application running on the passenger's computing device, using an API call, to determine whether the passenger intends to pick up any items. In some implementations, the UAV selection module 132 may acquire identification information associated with the passengers such that a database storing orders may be queried to determine whether any of the passengers have ordered any items. Certain UAVs 106 may be selected when compared to other UAVs 106 because certain UAVs 106 may be in a better position to deliver items.

In some implementations, the UAV selection module 132 is configured to broker the delivery of energy between various vehicles 102 and UAVs 106. For example, a user associated with a particular vehicle 102 may have an energy generator (e.g., solar cells, windmill, water turbine, and so forth) installed at the user's house. The energy generator may be used to transfer energy to the vehicle 102. In this example, the user signs up with an energy transfer service offered by a business entity associated with the server 104. The server 104 may determine the user's planned route for a particular day and determine that the vehicle 102 will not need all the energy stored in the vehicle 102. The server 104 may dispatch a drone to acquire some of the energy stored in the vehicle 102 and deliver that acquired energy to another vehicle 102 in need of energy. The server 104 may manage records such as a ledger that may be used the next time the user's UAV 106 is in need of energy. The energy that was acquired by the UAV 106 from the vehicle 102 may be applied as a credit for the user. In some implementations, the credit may be used for an online merchant account associated with a business entity that sells goods and services online. In some implementations, the UAV selection module 132 is configured to select the UAV 106 may be based on the spread between the cost of the energy and what the recipient is willing to pay for the energy.

In some implementations, the UAV selection module 132 is configured to select the UAV 106 based on the time it takes to transfer the energy. The time it takes to transfer the energy may be based on the age of batteries, usage history, charge/discharge conditions, current temperature, and so forth.

The UAV selection module 132 may select the UAV 106 based on the origin of the electrical energy. For example, the UAV selection module 132 may select the UAV 106 based on whether the energy was based on solar power, wind power, hydroelectric power, coal power, nuclear power, and so forth.

The UAV selection module 132 may select the UAV 106 based on how the UAV 106 or an associated entity expects to be compensated for the energy. For example, the cost associated with the transfer for the UAV 106 may be affected based on whether the energy is transferred based on time, based on the rate of the energy transfer, the type of energy, or a combination thereof. The UAV selection module 132 may select the UAV 106 based on the types of payment at least one of the vehicle 102 or UAV 106 may use.

In some implementations, after the UAV 106 transfers energy to the vehicle 102, the UAV 106 may be scheduled to navigate to a destination that the vehicle 102 is also planning to travel. In these implementations, a discount to the cost of the energy may be offered to the recipient of the energy.

The memory 310 may include the server authentication module 136 configured to authenticate information received from at least one of the server 104 or the UAV 106. In one example, the vehicle 102 is associated with a unique identifier such as a unique number. The server authentication module 136 may query a datastore that stores one or more unique identifiers to determine whether the datastore includes the unique identifier associated with the vehicle 102. If the unique identifier is included in the datastore, the server authentication module 136 authenticates the vehicle 102, and the server 104 accepts information provided by the vehicle 102. In another example, the server authentication module 136 may authenticate the vehicle 102 (or information provided by the vehicle 102) based on whether the information received from the vehicle 102 (e.g., the unique identifier) is equal to a complementary value stored by the server 104. In yet another example, the server authentication module 136 may be configured to authenticate information received from at least one of the vehicle 102 or the UAV 106 using symmetric key algorithms that use cryptographic keys or using asymmetric cryptography that use at least one private key and at least one public-key. In yet another example, the UAV 106 is associated with a unique identifier such as a unique number. The server authentication module 136 may query a datastore that stores one or more unique identifiers to determine whether the datastore includes the unique identifier associated with the UAV 106. If the unique identifier is included in the datastore, the server authentication module 136 authenticates the UAV 106, and the server 104 accepts information provided by the UAV 106. The server authentication module 136 may authenticate the UAV 106 (or information provided by the UAV 106) based on whether the information received from the UAV 106 (e.g., the unique identifier) is equal to a complementary value stored by the server 104.

The server authentication module 136 may be configured to authenticate at least one of the vehicle 102 or the UAV 106 based on challenge-response authentication. For example, the server 104 may require a password to be entered from at least one of the vehicle 102 or the UAV 106 to proceed with further communications.

In some implementations, the memory 310 includes a datastore 316 for storing information. The datastore 316 may use a flat file, database, linked list, tree, or other data structure to store the information. In some implementations, the datastore 316, or a portion thereof, may be distributed across at least one other device, such as a server, a network storage device, and so forth. As illustrated in FIG. 3, the datastore 316 may include at least one of the energy request data 116, the vehicle location data 120, the UAV location data 130, the control data 134, the server authentication data 138, or the environment data 220. The datastore 316 may include other data 318, which may include information such as administrator preferences, account information associated with users, and so forth.

The memory 310 may include one or more other modules 320. For example, a module may be configured to manage administrative preferences, account information, and so forth.

In some implementations, the functionality of the server 104 may be partially or completely implemented by the vehicle 102. In other implementations, the functionality of the server 104 is included in a distributed service, all or parts of which reside on different vehicles 102. For example, the functionality of the server 104 may be distributed across a plurality of vehicles 102, UAVs 106, or other devices.

Figure 4:
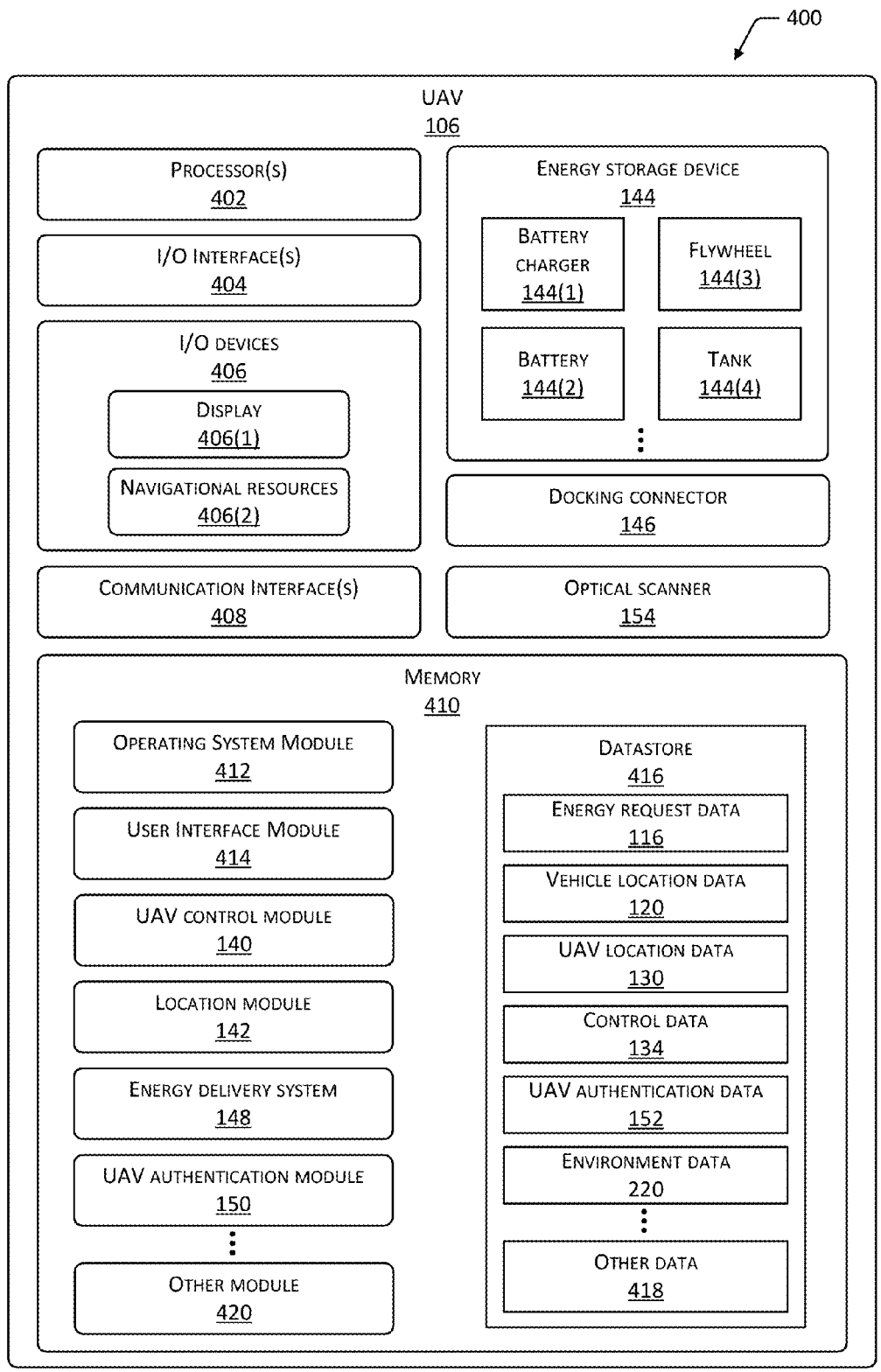
FIG. 4 is a schematic diagram of a UAV configured to travel to a vehicle and transfer energy to the vehicle.

FIG. 4 is a schematic diagram 400 of a UAV 106 configured to travel to a vehicle 102 and transfer energy to the vehicle 102. The UAV 106 may include a structure configured to support or hold the components of the UAV 106 discussed herein. The structure may be manufactured using composite materials that include carbon fiber, metal, glass, plastic, ceramic, and so forth. The UAV 106 may include at least one hardware processor 402 (or "processor") configured to execute stored instructions. The at least one hardware processor 402 may comprise one or more cores.

The UAV 106 includes at least one I/O interface 404 that enables portions of the UAV 106 (e.g., the hardware processor 402) to communicate with other devices. The I/O interface 404 may be configured to implement various protocols, such as I2C, SPI, USB, RS-232, HDMI, TOSLINK®, Bluetooth®, and so forth.

The I/O interface 404 may couple to one or more I/O devices 406. The I/O devices 406 may include one or more input devices such as a keyboard, a mouse, a microphone, a digital camera, user input buttons, and so forth. The I/O devices 406 may also include output devices such as one or more displays 406(1), audio speakers, haptic output devices, and so forth. The I/O devices 406 may also include respective navigational resources 406(2) such as, without limitation, satellite-based navigation or positioning such as GPS or the GLONASS, cellular tower-based locating, inertial navigation devices or systems, radio-based navigation receivers, dead reckoning devices, gyroscopes, odometers, compasses, accelerometers, and so on. In some embodiments, the I/O devices 406 may be physically incorporated within the UAV 106, or they may be externally placed. The I/O devices 406 may include various other devices, as well.

The UAV 106 may also include one or more communication interfaces 408. The communication interface 408 is configured to provide communications with vehicles 102, web-based resources, servers 104, other UAVs 106, routers, wireless access points, network access satellites, cellular towers, and so forth. The communication interfaces 408 may include wireless functions, devices configured to couple to one or more networks including LANs, Wireless-LANs, WANs, Wireless-WANs, and so forth. In some implementations, the communication interface 408 utilizes DC-BUS technology for communicating over power lines. The DC-BUS may be implemented by at least one of signaling technology that is byte oriented or DCB technology that is message oriented. Using the DC-BUS technology, the amount of electric wires used within the UAV 106 may be reduced, which may lower costs associated with the UAV 106. The UAV 106 may also include one or more busses or other internal communications hardware or software that allow for the transfer of data between the various modules and components of the UAV 106.

The UAV 106 may include the energy storage device 144. The energy storage device 144 is configured to store and release energy for transfer to the vehicle 102 such that the vehicle 102 may use the energy. As illustrated in FIG. 4, the energy storage device 144 may include a battery charger 144(1) configured to transfer energy to a rechargeable battery of the vehicle 102. The energy storage device 144 may include a battery 144(2). In one example, the UAV 106 travels to the vehicle 102 and releases the battery 144(2) such that a user of the vehicle 102 may insert the battery 144(2) into the vehicle 102. In yet another example, the energy storage device 144 may include a flywheel 144(3) configured to store energy as rotational motion. In yet another example, the energy storage device 144 may include a tank 144(4) or sorbent configured to hold or accumulate a reactant for use in generating energy. The reactant may include, but are not limited to, sugar, starch, alcohol, carbon monoxide, hydrogen, hydrocarbons (including gasoline, kerosene, natural gas), and so forth.

In some implementations, the energy storage device 144 may include additional mechanisms to provide energy in a mechanical, electrical, pneumatic, or hydraulic form. For example, the energy storage device 144 may comprise an internal combustion engine, generator, and tankage storing diesel fuel to operate the engine. Continuing the example, during operation, the engine may operate, burning the diesel fuel, to produce electricity which may then be delivered to the vehicle 102.

The UAV 106 may include the docking connector 146 that is used to couple or connect the UAV 106 to the vehicle 102. The docking connector 146 may be configured to couple to the docking mechanism 124. For example, the docking connector 146 may comprise one or more arms or mechanical engagement members configured to engage a portion of the vehicle 102. The docking connector 146 is discussed in more detail with regard to FIGS. 6 and 7. The UAV 106 may include the optical scanner 154. The optical scanner 154 may be configured to scan or read the optical target 128. In one example, the optical scanner 154 comprises a camera. The optical scanner 154 may be configured to read the light pattern being illuminated from the optical target 128. In some implementations, the optical scanner 154 is configured to read a machine-readable optical code attached to the vehicle 102. The optical scanner 154 may comprise a one-dimensional scanner, a two-dimensional scanner, or a three-dimensional scanner. The machine-readable optical code may comprise a one dimensional barcode (such as encoded using Code 128) or a two-dimensional barcode (such as encoded using QR Code). Although the UAV 106 depicted in FIG. 4 includes the optical scanner 154, in other implementations, the UAV 106 includes a scanner configured to operate in a non-visible spectrum. For example, the UAV 106 may include an ultraviolet scanner, an infrared scanner, a terahertz scanner, and so forth. These non-visible spectrum scanners may be used to authenticate the vehicle 102.

As illustrated in FIG. 4, the UAV 106 may include at least one memory 410 or memory device. The memory 410 may include at least one non-transitory CRSM. The CRSM may include at least one of an electronic storage medium, a magnetic storage medium, an optical storage medium, a quantum storage medium, or a mechanical computer storage medium. The memory 410 may include computer readable instructions, data structures, program modules, and other data for the operation of the UAV 106.

The memory 410 may include at least one OS module 412. The OS module 412 may be configured to manage hardware resources such as the I/O interface 404, the I/O devices 406, the communication interface 408, and provide various services to applications or modules executing on the hardware processor 402. The memory 410 may also store at least one of the following modules that may be executed as foreground applications, background tasks, daemons, and so forth.

The memory 410 may include a user interface module 414 configured to provide a user interface to a user or to the UAV 106. In one implementation, the user interface may be a web interface presented via the network and accessible to the user. In another implementation, the user interface may comprise an API that enables communication such as sending requests for items from the UAV 106 to at least one of the vehicle 102 or the server 104.

The memory 410 may include the UAV control module 140 configured to manage various components, devices or systems of the UAV 106. In the fully autonomous mode, the UAV control module 140 may be configured to manage, without human intervention, route selection, navigation, piloting, and so forth. In the semi-autonomous mode, the UAV control module 140 may be configured to enable some human intervention. For example, the UAV control module 140 may enable a human operator to designate or approve a particular navigational route. In some implementations, the UAV control module 140 is remotely controlled by a pilot on the ground or in another mobile machine.

In some implementations, the UAV control module 140 is configured to determine data indicative of local traffic, local weather, road conditions, or other factors that may affect how long the vehicle 102 would need to travel to a recharging station. Based on this data, the energy delivery system 148 may increase the amount of energy delivered to the vehicle 102 to make sure that the vehicle 102 has enough energy to reach the recharging station.

The memory 410 may include the location module 142 configured to determine the location of the UAV 106. The location module 142 may generate the UAV location data 130. The location module 142 may generate the UAV location data 130 based on one or more systems. These systems may include radio position finding systems, satellite-based navigation systems, inertial navigation systems, dead reckoning navigation systems, network positioning systems, tags and so forth. The satellite-based navigation system may include one or more of a GPS receiver, a GLONASS receiver, a Galileo receiver, an Indian Regional Navigational Satellite System, and so forth.

The inertial navigation system may employ sensors such as acceleration sensors, motion sensors and rotation sensors to calculate the position of the UAV 106 based on integration of these motions relative to a reference point. The dead reckoning navigation system may determine the location of the UAV 106 by integrating compass headings and distance traveled by the UAV 106 to determine displacement from a reference point. The satellite-based navigation system may use signals provided at least in part by orbital satellites to generate the location of the receiver that may be in the UAV 106. Network positioning may involve interrogating one or more cellular network access points to determine position based at least in part on radio frequency signal strength, association of a network address or access point with a previously determined location, and so forth. The location module 142 may also determine the location of the UAV 106 by receiving information from one or more location tags in an environment that is indicative of the location of the UAV 106. Location tags may include RFID, optical code tags, NFC tags, acoustic tags, and so forth.

The memory 410 may include the energy delivery system 148 comprising one or more mechanisms which control the transfer of energy between the UAV 106 and the vehicle 102. The energy delivery system 148 may operate with the docking connector 146 to transfer the energy from the UAV 106 to the vehicle 102. The energy delivery system 148 may include various mechanical and electrical components (e.g., controllers, valves, transistors, and so forth) that are configured to operate the transfer of the energy from the UAV 106 to the vehicle 102. In another example, the energy delivery system 148 is configured to provide energy to the vehicle 102 using wireless energy transmission. The wireless energy transmission may include various techniques such as the use of electromagnetic induction or electromagnetic radiation.

The memory 410 may include the UAV authentication module 150 configured to authenticate information received from at least one of the vehicle 102 or the server 104. In one example, the vehicle 102 is associated with a unique identifier such as a unique number. The UAV authentication module 150 may query a datastore that stores one or more unique identifiers to determine whether the datastore includes the unique identifier associated with the vehicle 102. If the unique identifier is included in the datastore, the UAV authentication module 150 authenticates the vehicle 102, and the UAV 106 accepts information provided by the vehicle 102. In another example, the UAV authentication module 150 may authenticate the vehicle 102 (or information provided by the vehicle 102) based on whether the information received from the vehicle 102 (e.g., the unique identifier) is equal to a complementary value stored by the UAV 106.

The UAV authentication module 150 may be configured to authenticate at least one of the vehicle 102 or the server 104 based on challenge-response authentication. For example, the UAV 106 may require a password from at least one of the vehicle 102 or the server 104 to be entered to proceed with further communications.

In some implementations, the memory 410 includes a datastore 416 for storing information. The datastore 416 may use a flat file, database, linked list, tree, or other data structure to store the information. In some implementations, the datastore 416, or a portion thereof, may be distributed across at least one other device, such as a server, a network storage device, and so forth. As illustrated in FIG. 4, the datastore 416 may include at least one of the energy request data 116, the vehicle location data 120, the UAV location data 130, the control data 134, the UAV authentication data 152, or the environment data 220. The datastore 416 may include other data 418, which may include information such as administrator preferences, account information associated with users, and so forth.

The memory 410 may include one or more other modules 420. For example, a module may be configured to manage administrative preferences, account information, and so forth.

Figure 5:
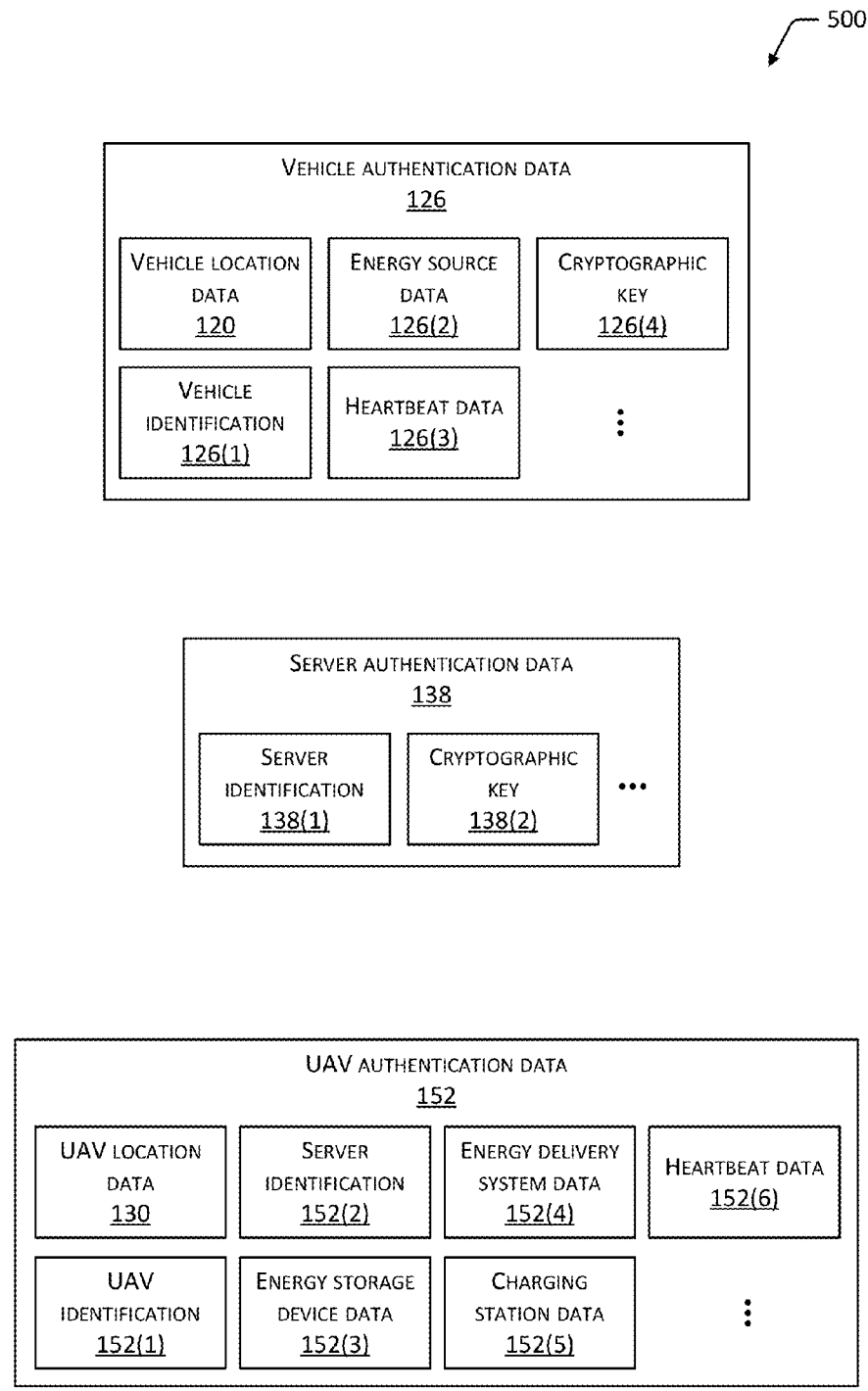
FIG. 5 illustrates examples of the vehicle authentication data, the server authentication data, and the UAV authentication data.

FIG. 5 illustrates examples 500 of the vehicle authentication data 126, the server authentication data 138, and the UAV authentication data 152. The vehicle authentication data 126 may include a variety of data used to authenticate the vehicle 102. In FIG. 5, the vehicle authentication data 126 includes one or more of the vehicle location data 120, vehicle identification data 126(1), energy source data 126(2), heartbeat data 126(3), or a cryptographic key 126(4).

The UAV 106 may use the vehicle location data 120 to authenticate the vehicle 102. In one example, the server 104 provides control data 134 to the UAV 106, and the control data 134 indicates a rendezvous area specified by a range of location coordinates where the vehicle 102 is likely to be positioned when the UAV 106 meets the vehicle 102 for transferring energy. When the UAV 106 is proximate to the vehicle 102, the UAV 106 acquires vehicle location data 120 from the vehicle 102, and the UAV 106 determines that the acquired vehicle location data 120 is within the range of location coordinates that were included in the control data 134. In this example, this determination results in the vehicle 102 being authenticated by the UAV 106, resulting in the UAV 106 accepting and processing further data from the vehicle 102.

The UAV 106 may use the vehicle identification 126(1) to authenticate the vehicle 102. The vehicle identification 126(1) may comprise a unique vehicle identifier such as a unique number. The UAV 106 may acquire the vehicle identification 126(1) from the vehicle 102, and the UAV 106 may query a datastore that stores a plurality of different vehicle identifiers associated with different vehicles 102 to determine whether the datastore includes the acquired unique vehicle identifier. If the acquired unique identifier is included in the datastore, the UAV 106 authenticates the vehicle 102. The vehicle identification 126(1) may also indicate the type of vehicle 102. For example, the vehicle identification 126(1) may indicate that the vehicle 102 is an automobile, a motorcycle, a boat, and so forth. In some implementations the vehicle identification 126(1) may include information indicative of a particular make, model, body style, and so forth of the vehicle 102.

The energy source data 126(2) may comprise information about the energy source 110. The energy source data 126(2) may include a unique identifier associated with the energy source 110, a description of the type of energy stored within the energy source 110, an indication of the current amount of energy that is included in the energy source 110, and so forth. In one example, the UAV 106 acquires the energy source data 126(2) and determines that the UAV 106 has the capability to transfer energy to the type of energy source 110 identified by the description information, resulting in the UAV 106 authenticating the vehicle 102.

The energy source data 126(2) may include information about the energy transfer capabilities of the vehicle 102. For example, the information may indicate the energy source's 110 voltage rating, current rating, energy transfer rate rating, information about age (e.g., relatively old energy source 110 or a relatively new energy source 110), usage history, current charge/discharge conditions, and so forth. In another example, the energy source data 126(2) may include information about the present temperature of the energy source 110 and external environment, which could affect energy transfer rate and time needed to transfer energy.

In yet another example, the energy source data 126(2) may indicate information about a source that generated the energy stored by the energy source 110. For example, the energy may have been generated by solar power, wind power, coal power, nuclear power, and so forth. In yet another example, the energy source data 126(2) may indicate a monetary value associated with the energy stored in the energy source 110.

The heartbeat data 126(3) may comprise periodic signals generated at regular time intervals. The UAV 106 may use the heartbeat data 126(3) to confirm that the vehicle 102 is connected to the UAV 106. The heartbeat data 126(3) may be provided over a wired connection between the vehicle 102 and the UAV 106. In some implementations, the UAV 106 may use the heartbeat data 126(3) to confirm that energy is transferred from the UAV 106 to the vehicle 102. For example, the UAV 106 may be configured to deliver 2 kilowatt hours (kWH) of energy to vehicle 102. The vehicle 102 may be configured to provide the heartbeat data 126(3) when the vehicle 102 is receiving energy from the UAV 106. Based on the number of periodic signals received by the UAV 106 from the vehicle 102 during the transfer of energy, the UAV 106 may determine whether or not the delivery of the energy occurred, and if so, how much energy was actually transferred.

The cryptographic key 126(4) may include any suitable type of key. The cryptographic key 126(4) may be described as data that is applied to a string or a block of data for authentication. In some implementations, the vehicle 102 uses an installed signed certificate and a private key for authentication. For example, upon registration to receive energy transfers, the vehicle 102 may be taken to a service shop which installs the cryptographic key 126(4) to a memory onboard the vehicle 102.

In some implementations, at least one of the server 104, the UAV 106, or another system may be configured to cryptographically verify at least one of the vehicle identification 126(1) or the cryptographic key 126(4). In one example, at least one of the vehicle identification 126(1) or the cryptographic key 126(4) may be encrypted so as to be decrypted by the system that will cryptographically verify at least one of the vehicle identification 126(1) or the cryptographic key 126(4). The ability to decrypt at least one of the vehicle identification 126(1) or the cryptographic key 126(4) serves as cryptographic verification of at least one of the vehicle identification 126(1) or the cryptographic key 126 (4).

In another example, at least one of the vehicle identification 126(1) or the cryptographic key 126(4) may be digitally signed (thereby producing a digital signature of at least one of the vehicle identification 126(1) or the cryptographic key 126(4)) such that the digital signature is verifiable by the system that will cryptographically verify at least one of the vehicle identification 126(1) or the cryptographic key 126(4). In yet other examples, both encryption and digital signatures are used for cryptographic verifiability (and security). The key used to encrypt or digitally sign at least one of the vehicle identification 126(1) or the cryptographic key 126(4) may vary in accordance with various embodiments. Different keys may be used for encryption and digital signing.

In some embodiments, a key used to encrypt at least one of the vehicle identification 126(1) or the cryptographic key 126(4) is a public key of a public/private key pair. The private key of the key pair may be maintained securely by the system to which at least one of the vehicle identification 126(1) or the cryptographic key 126(4) is to be provided, thereby enabling the system to decrypt at least one of the vehicle identification 126(1) or the cryptographic key 126(4) using the private key of the key pair. Using the public key to encrypt at least one of the vehicle identification 126(1) or the cryptographic key 126(4) may include generating a symmetric key, using the symmetric key to encrypt at least one of the vehicle identification 126(1) or the cryptographic key 126(4), and encrypting the symmetric key using the public key. The encrypted symmetric key may be provided to a system with at least one of the vehicle identification 126(1) or the cryptographic key 126(4) to enable the system to use the corresponding private key to decrypt the symmetric key and use the decrypted symmetric key to decrypt at least one of the vehicle identification 126(1) or the cryptographic key 126(4).

In some embodiments, at least one of the vehicle identification 126(1) or the cryptographic key 126(4) is digitally signed using a private key of a public/private key pair corresponding to the computer system that encrypts and digitally signs at least one of the vehicle identification 126(1) or the cryptographic key 126(4). For example, an application that manages at least one of the vehicle identification 126(1) or the cryptographic key 126(4) may be provisioned with the private key and at least one of the vehicle identification 126(1) or the cryptographic key 126(4) may include a certificate for the private key for use by a system for verification of the digital signature of at least one of the vehicle identification 126(1) or the cryptographic key 126(4). Other variations include where a symmetric key shared between the vehicle 102 and the system that cryptographically verifies at least one of the vehicle identification 126(1) or the cryptographic key 126(4) is used to encrypt, digitally sign, or encrypt and digitally sign at least one of the vehicle identification 126(1) or the cryptographic key 126 (4).

The server authentication data 138 may include a variety of data used to authenticate the server 104. For example, the server authentication data 138 may include at least one of a server identification 138(1) or a cryptographic key 138(2). The server ID 138(1) may comprise a unique server identifier. The vehicle 102 may use the server ID 138(1) to authenticate the server 104. For example, when the vehicle 102 sends an energy delivery request to the server 104, the server 104 may provide the server ID 138(1) to the vehicle 102. The vehicle 102 may determine that the server ID 138(1) corresponds with one of a plurality of different server IDs 138(1), resulting in the vehicle 102 authenticating the server 104.

The cryptographic key 138(2) may include any suitable type of key. The cryptographic key 138(2) may be described as data that is applied to a string or a block of data to authenticate the server 104. At least one of the vehicle 102 or the UAV 106 may use the cryptographic key 138(2) to authenticate the server 104.

The UAV authentication data 152 may include a variety of data used to authenticate the UAV 106. In FIG. 5, the UAV authentication data 152 includes at least one of the UAV location data 130, UAV identification 152(1), server identification 152(2), energy storage device data 152(3), energy delivery system data 152(4), charging station data 152(5), or heartbeat data 152(6).

The vehicle 102 may use the UAV location data 130 to authenticate the UAV 106. In one example, the server 104 provides control data 134 to the UAV 106, and the control data 134 indicates a suggested route for the UAV 106 to meet the vehicle 102. When the UAV 106 is proximate to the vehicle 102, the vehicle 102 acquires UAV location data 130 from the UAV 106, and the vehicle 102 determines whether the route traveled by the UAV 106 is consistent with an expected route of travel. If the route corresponds to an expected route, the vehicle 102 authenticates the UAV 106, resulting in the vehicle 102 accepting and processing further data from the UAV 106. In some implementations, the UAV 106 may be proximate to the vehicle 102 when the UAV 106 is within communication range of the vehicle 102. In another example, the UAV 106 may be proximate to the vehicle 102 when the UAV 106 is within visual range of the vehicle 102.

The vehicle 102 may use the UAV ID 152(1) to authenticate the UAV 106. The UAV ID 152(1) may comprise a unique UAV identifier such as a unique number. The vehicle 102 may acquire the UAV ID 152(1) from the UAV 106, and the vehicle 102 may query a datastore that stores a copy of the UAV ID 152(1) to determine whether the acquired UAV ID 152(1) corresponds to the copy of the UAV ID 152(1). If the vehicle 102 determines that the acquired UAV ID 152(1) corresponds with the copy of the UAV ID 152(1), the vehicle 102 authenticates the UAV 106.

The server ID 152(2) may comprise a unique server identifier. The vehicle 102 may use the server ID 152(2) to authenticate the UAV 106. For example, when the server 104 instructs the UAV 106 to transfer energy to the vehicle 102, the server 104 may provide the server ID 152(2) to the vehicle 102 and the UAV 106. Once the UAV 106 arrives near the vehicle 102, the vehicle 102 may instruct the UAV 106 to provide the server ID 152(2). Once the vehicle 102 acquires the server ID 152(2) from the UAV 106, the vehicle 102 determines whether the acquired server ID 152(2) matches or corresponds with the server ID 152(2) that was previously provided by the server 104. If the vehicle 102 determines that the acquired server ID 152(2) corresponds with the previously provided server ID 152(2), the vehicle 102 authenticates the UAV 106.

The energy storage device data 152(3) may represent information about the energy storage device 144. For example, energy storage device data 152(3) may include a unique identifier associated with the energy storage device 144, a description of the type of energy stored within the energy storage device 144, an indication of the current amount of energy that is included in the energy storage device 144, and so forth. In one example, the vehicle 102 acquires the energy storage device data 152(3) and determines that the energy storage device 144 has the capability to transfer energy to the type of energy source 110 of the vehicle 102, resulting in the vehicle 102 authenticating the UAV 106.

The energy storage device data 152(3) may include information about where the energy stored in the energy storage device 144 was generated. For example, the energy may have been generated by solar power, wind power, hydroelectric power, coal power, nuclear power, and so forth. In yet another example, the energy storage device data 152(3) may indicate a monetary value associated with the energy stored in the energy storage device 144. The energy storage device data 152(3) may include information about the cost of how much the energy storage device 144 is presently storing along with a mix of energy sources 110 that were used to generate that energy.

The energy delivery system data 152(4) may represent information about the energy delivery system 148. For example, energy delivery system data 152(4) may include a unique identifier associated with the energy delivery system 148, a description of the type of connectors included within the energy delivery system 148, and so forth. In one example, the vehicle 102 acquires the energy delivery system data 152(4) and determines that the energy delivery system 148 has the capability to transfer energy to the type of energy source 110 of the vehicle 102, resulting in the vehicle 102 authenticating the UAV 106.

The energy delivery system data 152(4) may include information about the energy transfer capabilities of the UAV 106. For example, the information may indicate the energy storage device's 144 voltage rating, current rating, energy transfer rate rating, information about age (e.g., relatively old energy storage device 144 or a relatively new energy storage device 144), usage history, current charge/discharge conditions, and so forth. In another example, the energy delivery system data 152(4) may include information about the present temperature of the energy storage device 144 and external environment, which could affect energy transfer rate and time needed to transfer energy.

The charging station data 152(5) may represent information indicating a charging station associated with the UAV 106. In one example, the vehicle 102 acquires the charging station data 152(5) and determines that the UAV 106 is associated with a predetermined charging station, resulting in the vehicle 102 authenticating the UAV 106.

The heartbeat data 152(6) may comprise periodic signals generated at regular time intervals. The vehicle 102 may use the heartbeat data 152(6) to confirm that the UAV 106 is connected to the vehicle 102. The heartbeat data 152(6) may be provided over a wired connection between the vehicle 102 and the UAV 106. In some implementations, the heartbeat data 152(6) comprises signals that are sent at designated times which may or may not be at irregular times. Irregular signals may be used to confirm that a particular device provided information at a particular time. Such a configuration may reduce theft of energy. For example, the UAV 106 may be configured to provide a heartbeat signal at a designated time. If the vehicle 102 is unable to confirm that the heartbeat signal was provided at the designated time, such a situation may indicate that the UAV 106 did not communicate with vehicle 102.

Figure 6:
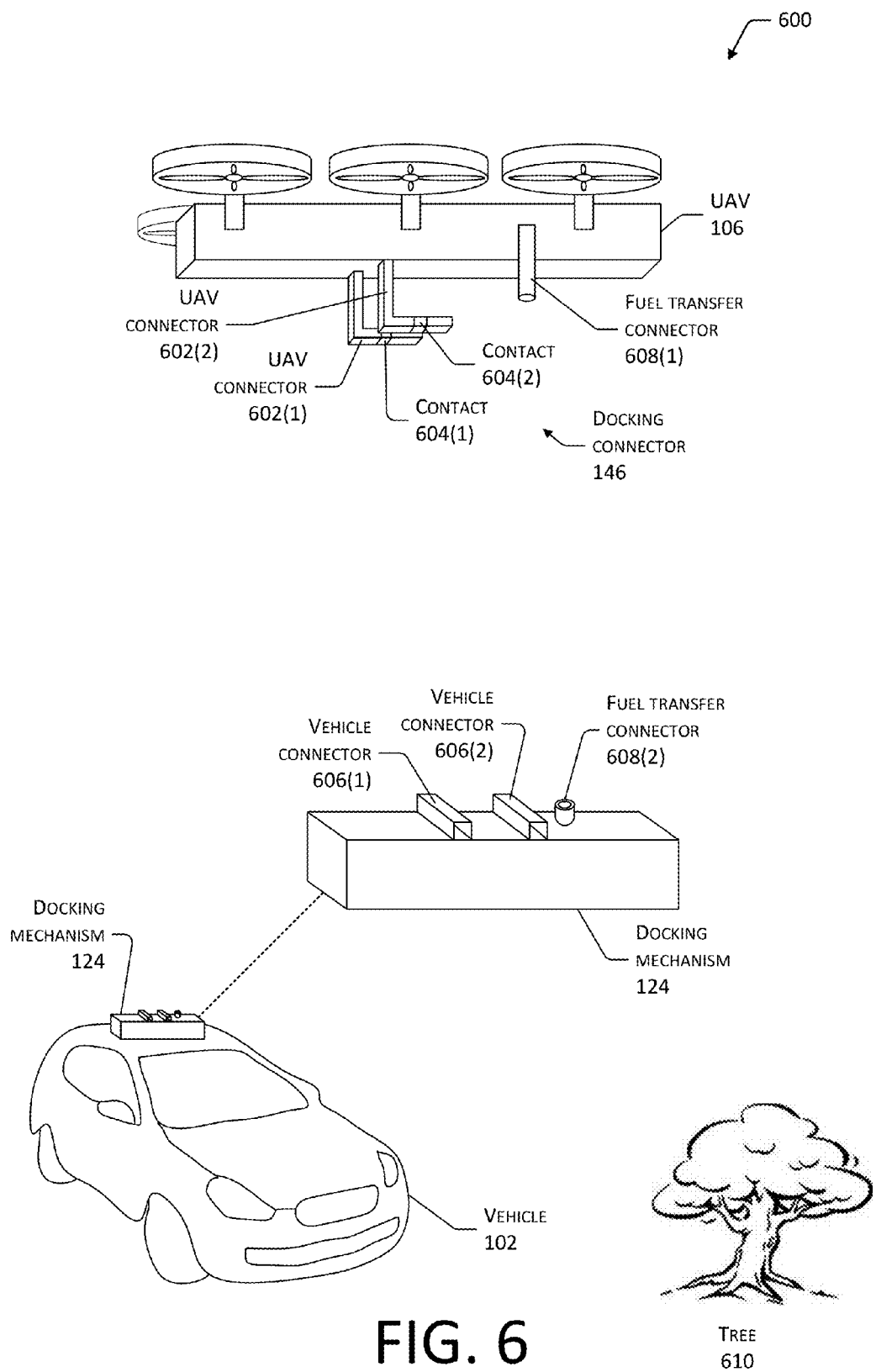
FIG. 6 illustrates examples of a UAV's docking connector and a vehicle's docking mechanism, which when coupled may provide electrical contacts, fuel transfer connectors, and so forth.

FIG. 6 illustrates examples 600 of the UAV's 106 docking connector 146 and the vehicle's 102 docking mechanism 124, which when coupled may provide electrical contacts, fuel transfer connectors, and so forth. The docking connector 146 includes a first UAV connector 602(1) that has a first contact 604(1), and a second UAV connector 602(2) that has a second contact 604(2). The docking mechanism 124 includes a first vehicle connector 606(1) and a second vehicle connector 606(2). As the UAV 106 docks with the vehicle 102, the vehicle connectors 606(1) and 606(2) are configured to receive the UAV connectors 602(1) and 602(2), respectively. When the UAV 106 is docked with the vehicle 102, a flow of electrical current is provided to the vehicle 102 through the contacts 604(1) and 604(2), respectively.

The docking connector 146 includes a first fuel transfer connector 608(1), and the docking mechanism 124 includes a second fuel transfer connector 608(2). In this example, the second fuel transfer connector 608(2) is configured to receive the first fuel transfer connector 608(1). Once the fuel transfer connectors 608(1) and 608(2) are connected, the UAV 106 may deliver fuel (e.g., gasoline) to the vehicle 102.

In FIG. 6, a tree 610 is depicted. The vehicle 102 may be configured to generate environment data 220 that indicates the presence of the tree 610. This environment data 220 may be provided to the UAV 106, and the UAV 106 may use this environment data 220 when docking with the vehicle 102. In another implementation the UAV 106 may detect the presence of the tree 610 or another object or hazard, and provide information to the vehicle 102.

Figure 7:
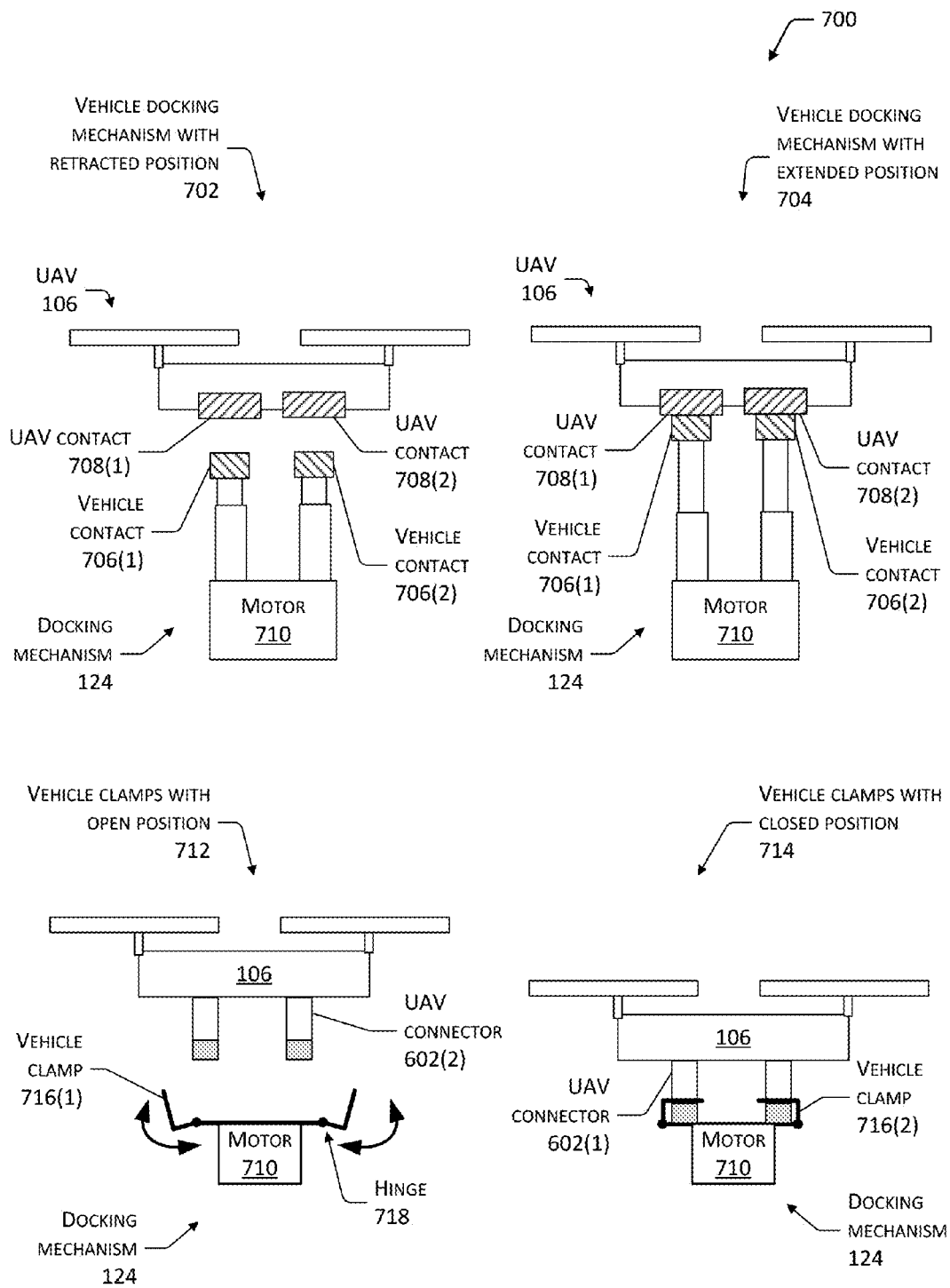
FIG. 7 illustrates detailed views of the coupling between the UAV docking connector and the vehicle docking mechanism.

FIG. 7 illustrates detailed views 700 of the coupling between the UAV docking connector 146 and the vehicle docking mechanism 124. In FIG. 7, a vehicle docking mechanism with retracted position 702, and a vehicle docking mechanism with extended position 704 are depicted.

The docking mechanism 124 includes a first vehicle contact 706(1) and a second vehicle contact 706(2). These contacts are configured to couple with the UAV contacts 708(1) and 708(2), respectively, to receive energy from the UAV 106. The docking mechanism 124 includes a motor 710 (e.g., a servo motor) that is configured to extend and retract the vehicle contacts 706(1) and 706(2).

In FIG. 7, vehicle clamps with open position 712, and vehicle clamps with closed position 714 are depicted. The docking mechanism 124 includes vehicle clamps 716 configured to pivot at hinges 718. The vehicle clamps 716 are configured to close and attach to the UAV connectors 602. For example, the vehicle clamp 716(1) is configured to pivot and attach to the UAV connector 602(1). In some implementations, when in the closed position, the vehicle clamps 716 may comprise electrical conductors configured to receive electrical energy from the contacts 604 (not shown) of the UAV connectors 602. The docking mechanism 124 includes the motor 710 that is configured to open and close the vehicle clamps 716.

In some implementations, the docking connector 146 includes pogo pins to establish an electrical connection between the vehicle 102 and the UAV 106. The docking connector 146 may include any suitable mechanism using mechanical components such as gears and cams to establish a connection between the vehicle 102 and the UAV 106.

Figure 8:
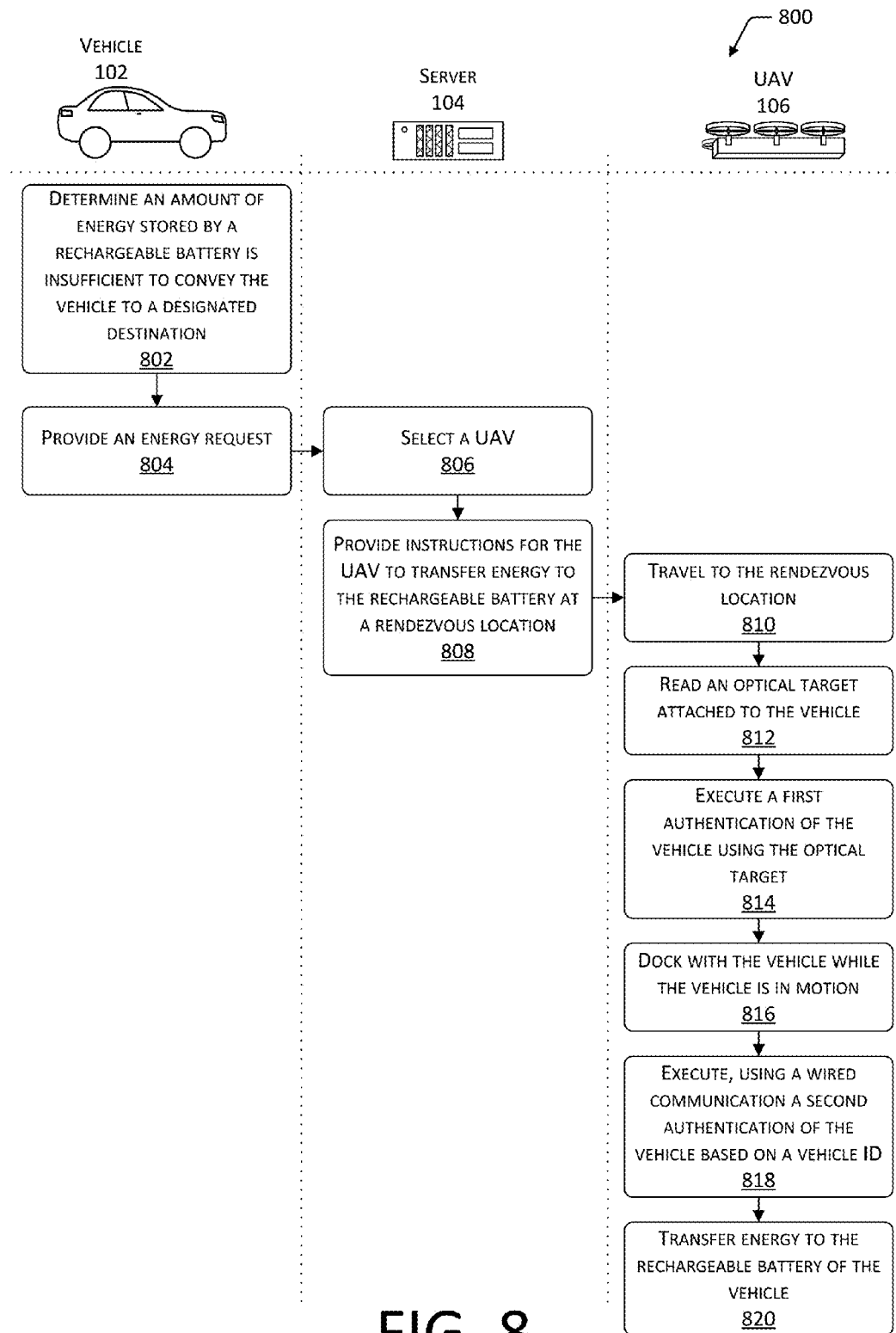
FIG. 8 is a flow diagram illustrating a process of charging a rechargeable battery of the vehicle using a vehicle, a server, and a UAV.

FIG. 8 is a flow diagram illustrating a process 800 of charging a rechargeable battery using a vehicle 102, a server 104, and a UAV 106. Although the process 800 is described with reference to the flowchart illustrated in FIG. 8, many other methods performing the acts associated with the process 800 may be used. For example, the order of the steps may be changed, some of the steps described may be optional, and additional steps may be included.

At 802, the vehicle 102 determines an amount of energy stored by a rechargeable battery is insufficient to convey the vehicle 102 to a designated destination. The vehicle 102 may be configured to periodically (e.g., every 5 minutes) determine whether the rechargeable battery has enough energy to convey the vehicle 102 to the designated destination, such as a recharge station, home, office, and so forth.

At 804, the vehicle 102 provides an energy request to the server 104. The control data 134 may comprise the energy request. Although in this example the vehicle 102 provides the energy request to the server 104, in other examples, the vehicle 102 provides the energy request to the UAV 106.

At 806, the server 104 selects a UAV 106. In one example, the server 104 selects the UAV 106 in response to the following: a first determination that the UAV 106 is located closer to the vehicle 102 when compared to other UAVs 106; and a second determination that the battery charger has a predetermined amount of energy. In another example, the UAV 106 is selected based on cost. When compared to the cost of other UAVs 106, the selected UAV 106 is configured to transfer energy at a cheaper cost.

At 808, the server 104 provides instructions for the UAV 106 to transfer energy to the rechargeable battery at a rendezvous location. At least one of the vehicle 102, the server 104, or the UAV 106 may determine the rendezvous location. In some implementations, the rendezvous location is determined based on the vehicle location data 120 and the UAV location data 130.

At 810, the UAV 106 travels to the rendezvous location. The UAV 106 may use various information to travel to the rendezvous location. For example, UAV 106 may use the movement data 222 generated by the vehicle 102. The movement data 222 may indicate at least one of the following: speed of the vehicle 102; direction of the vehicle 102; an anticipated action of the vehicle 102; and a destination location of the vehicle 102. The UAV 106 may analyze the movement data 222 to adjust the rendezvous location while travelling to the vehicle 102.

At 812, the UAV 106 reads an optical target 128 attached to the vehicle 102. For example, the optical target 128 may be configured to cause a plurality of lights to form a designated shape. The UAV 106 may read the optical target 128 using an optical scanner 154 such as a camera. At 814, the UAV 106 executes a first authentication of the vehicle 102 using the optical target 128. For example, the UAV 106 may be configured to authenticate the vehicle 102 if the plurality of lights of the optical target 128 form a circle shape.

In other implementations, instead of or in addition to the optical target 128, radio frequency signals may be used. For example, signals in a 60 gigahertz band may be used, RFID targets may be read, a transponder may be triggered, and so forth.

At 816, the UAV 106 docks with the vehicle 102 while the vehicle 102 is in motion. Although in this example, the vehicle 102 is in motion when the UAV 106 connects to the vehicle 102, in other examples the UAV 106 is configured to dock with the vehicle 102 while the vehicle 102 is not moving or is parked. The UAV 106 may dock with the vehicle 102 using any suitable mechanism, such as the mechanisms illustrated in FIGS. 6 and 7.

At 818, the UAV 106 executes, using a wired communication, a second authentication of the vehicle 102 based on a vehicle ID 126(1). For example, the UAV 106 may determine whether the vehicle ID 126(1) is included within a datastore of different vehicle IDs 126(1). If the vehicle ID 126(1) is included within a datastore of different vehicle IDs 126(1), the UAV 106 authenticates the vehicle 102.

At 820, the UAV 106 transfers energy to the rechargeable battery of the vehicle 102. In one example, the UAV 106 includes a battery charger configured to transfer the energy by way of a flow of electrical current at a certain voltage, frequency, and so forth.

A payment process may be implemented for the transfer of energy. The payment process may include a report about how much energy was transferred between the vehicle 102 and the UAV 106, the time it took to transfer the energy, the origin of the energy that was transferred, the heartbeat data 152(6), energy transfer conditions, and so forth. Based on the report information, the server 104 may facilitate the payment by, for example, transferring money between stored value accounts, charging a payment instrument that the vehicle 102 has on file, and so forth. In some implementations, a virtual currency, cryptocurrency, payment token, or other stored value indicator may be transferred between the vehicle 102 and the UAV 106.

In some implementations, the UAV 106 is configured to couple to the vehicle 102 using an electrical conductor when docked. The electrical conductor may include an electrical wire or a contact pad. The vehicle 102 may be configured to provide heartbeat signals to the UAV 106 using the electrical conductor. The UAV 106 is configured to confirm that the energy has been transferred to the vehicle 102 based on receiving a predetermined number of the heartbeat signals from the vehicle 102.

Figure 9:
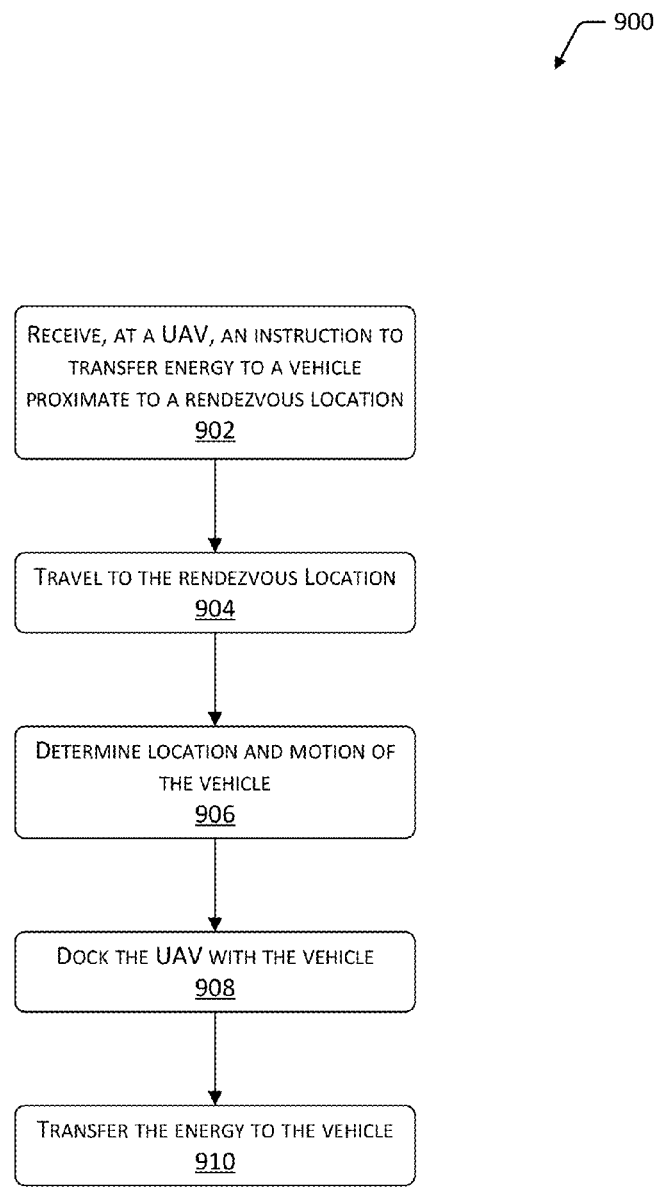
FIG. 9 is a flow diagram illustrating a process of a UAV traveling to a rendezvous location, docking, and transferring energy to a vehicle.

FIG. 9 is a flow diagram illustrating a process 900 of a UAV 106 traveling to a rendezvous location and transferring energy to a vehicle 102. Although the process 900 is described with reference to the flowchart illustrated in FIG. 9, many other methods performing the acts associated with the process 900 may be used. For example, the order of the steps may be changed, some of the steps described may be optional, and additional steps may be included.

At 902, the UAV 106 receives an instruction to transfer energy to a vehicle 102 proximate to a rendezvous location. The control data 134 may comprise the instruction to transfer energy to a vehicle 102 proximate to the rendezvous location. The vehicle 102 may be proximate to the rendezvous location when the vehicle 102 is located within a designated distance of the rendezvous location. For example, the designated distance may be equal to or less than one kilometer. At least one of the vehicle 102, the server 104, or the UAV 106 may determine the rendezvous location. In some implementations, the rendezvous location is determined based on the vehicle location data 120 and the UAV location data 130.

At 904, the UAV 106 travels to the rendezvous location. The UAV 106 may travel to the rendezvous location using the environment data 220. The environment data 220 may indicate an existence of objects proximate to the vehicle 102. In one example, the objects may include overhead electrical wires or a bridge. The UAV 106 may navigate to the vehicle 102 so as to avoid the objects while moving to the vehicle 102.

At 906, the UAV 106 determines location and motion of the vehicle 102. The UAV 106 may determine the location of the vehicle 102 using the vehicle location data 120. The UAV 106 may determine the motion of the vehicle 102 using the movement data 222. The movement data 222 may be indicative of at least one of the following: speed of the vehicle 102; direction of the vehicle 102; an anticipated action of the vehicle 102; and a destination location of the vehicle 102. In some implementations, the anticipated action may be determined based on onboard systems of the vehicle 102. For example, the vehicle 102 may include the ACC system discussed above with regard to FIG. 1. The ACC system may determine that the vehicle 102 will likely remain at a constant speed, which may result in a situation where the UAV 106 has an easier time docking to the vehicle 102 than when compared to a situation where the ACC system expects the vehicle 102 to increase or decrease speed. The destination location may indicate a location that the vehicle 102 is expected to travel to based on information input by a user associated with the vehicle 102. For example, the driver of the vehicle 102 may enter in their home address. An analysis of the destination location and the route between the current location the destination location may indicate whether any turns or windy roads are expected. Such information may be useful to the UAV 106 when performing the docking process.

At 908, the UAV 106 docks with the vehicle 102. The UAV 106 may dock with the vehicle 102 using any suitable mechanism such as the examples illustrated in FIGS. 6 and 7. In some implementations, the UAV 106 is configured to provide data to the vehicle 102 (or a user associated with the vehicle 102) that represents instructions for the vehicle 102 to perform an action before the UAV 106 docks with the vehicle 102. For example, the UAV 106 may be configured to dock with the vehicle 102 while the vehicle 102 is moving between zero and forty kilometers per hour. The vehicle 102 may be currently travelling on highway at a speed of 96 kilometers per hour. When the UAV 106 approaches the vehicle 102, the UAV 106 may provide data to the vehicle 102 that instructs the vehicle 102 to exit the highway to a road in which the vehicle 102 would be expected to travel between zero and forty kilometers per hour. The instructions may be presented using the user interface module 216 of the vehicle 102. For example, the dashboard or a heads-up-display in the vehicle 102 may indicate to the driver that the vehicle 102 is to be maintained between zero and forty kilometers per hour. In this example, if the vehicle 102 continues to travel at rate above forty kilometers per hour, the UAV 106 may be configured to terminate the process of attempting to dock with the vehicle 102, and return to a designated location.

At 910, the UAV 106 transfers the energy to the vehicle 102. The UAV 106 may include the energy storage device 144 that is configured to transfer energy. In some implementations, transferring the energy to the vehicle 102 may include transferring liquid fuel from a tank 144(4) to another tank 144(4) located within the vehicle 102. In other implementations, transferring the energy to the vehicle 102 includes transferring the energy from the energy storage device 144 to the vehicle 102 as a flow of electrical current using a wired connection. For example, the energy storage device 144 may include a battery charger 144(1) configured to provide a flow of electrical current using a wired connection. The energy storage device 144 may be separable from the UAV 106. Transferring the energy to the vehicle 102 may include separating the energy storage device 144 from the UAV 106 and coupling the energy storage device 144 to the vehicle 102.

In some implementations, the energy storage device 144 is also configured to provide energy to the UAV 106. In other implementations, the UAV 106 includes an energy supply that is separate from the energy storage device 144.

The UAV 106 may authenticate the vehicle 102. In one example, the UAV 106 acquires, using the optical scanner 154, vehicle identification 126(1) information from a machine-readable optical code attached to the vehicle 102. The UAV 106 may query a datastore storing a plurality of vehicle identification 126(1) information to determine that the acquired vehicle identification 126(1) information is included within the datastore.

The UAV 106 may be configured to connect to the vehicle 102 using a wired connection. The UAV 106 may acquire vehicle identification 126(1) information from the vehicle 102 using the wired connection. The UAV 106 may query a datastore storing a plurality of vehicle identification 126(1) information to determine that the acquired vehicle identification 126(1) information is included within the datastore. In some implementations, the UAV 106 may authenticate the vehicle 102 by applying a hash function to the vehicle identification 126(1) to generate a hash value. If the UAV 106 determines that the hash value corresponds with another hash value stored by the UAV 106, the UAV 106 may authenticate the vehicle 102.

In some implementations, using wireless communication, the UAV 106 may execute a first authentication process to authenticate the vehicle 102 before traveling to the rendezvous location. Thereafter, before connecting to the vehicle 102 using a wired connection, the UAV 106 may execute a second authentication process to authenticate the vehicle 102. The second authentication process may be executed using the wireless communication. Then, after connecting to the vehicle 102 using the wired connection, the UAV 106 may execute a third authentication process to authenticate the vehicle 102. The third authentication may be executed using wired communication.

The authentication between the vehicle 102 and the UAV 106 may use technologies employing any suitable radio frequency. For example, the authentication process may be performed using Bluetooth®, RFID, NFC tags, acoustic tags, and so forth.

The UAV 106 may authenticate the vehicle 102 using the optical target 128 attached to the vehicle 102. The optical target 128 may comprise one or more lights configured to generate an optical pattern. The UAV 106 may authenticate the vehicle 102 if the generated optical pattern matches or corresponds to a predetermined pattern.

In some implementations, the UAV 106 may be configured to transmit data that indicates that the UAV 106 has additional energy which may be transferred. The transmitted data may also indicate a proposed cost for the additional energy. The vehicle 102 may transmit data to the UAV 106 indicating a request for the additional energy at the proposed cost.

Figure 10:
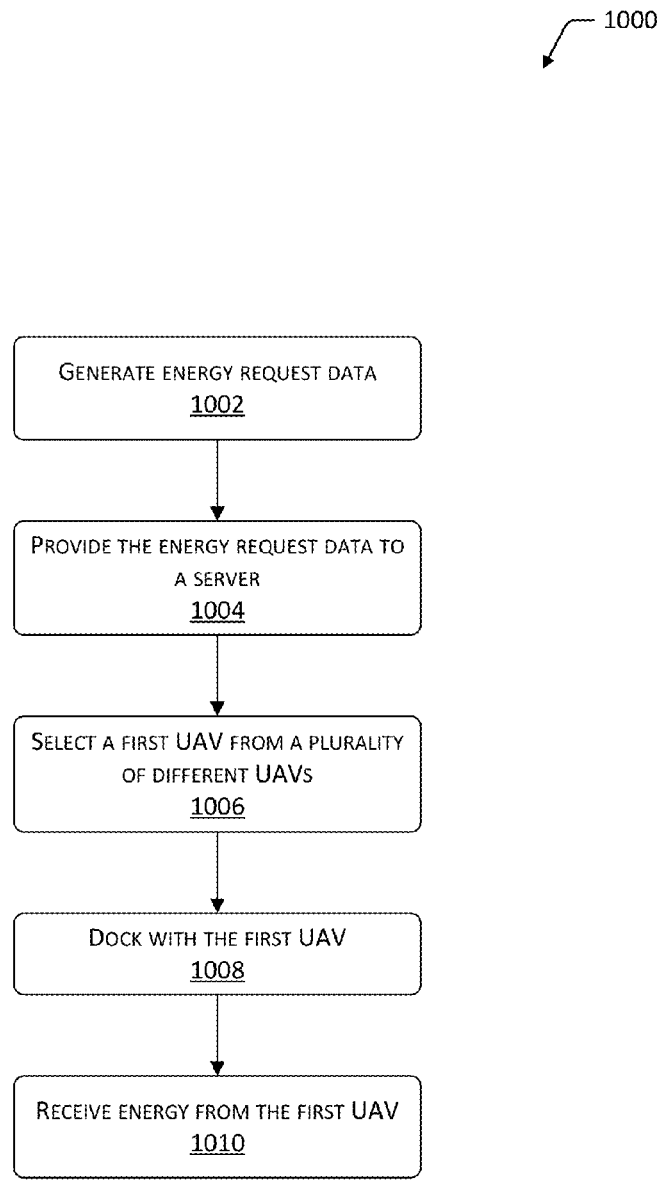
FIG. 10 is a flow diagram illustrating a process of providing an energy request to a server and receiving energy from a UAV.

FIG. 10 is a flow diagram illustrating a process 1000 of providing an energy request to a server 104 and receiving energy from a UAV 106. Although the process 1000 is described with reference to the flowchart illustrated in FIG. 10, many other methods performing the acts associated with the process 1000 may be used. For example, the order of the steps may be changed, some of the steps described may be optional, and additional steps may be included.

At 1002, a device (e.g., the vehicle 102) generates energy request data 116. The device may comprise at least one of the vehicle 102, surveillance equipment, communications equipment, or utility control equipment. In some implementations, the device generates the energy request data 116 in response to a determination that the energy source 110 is below a threshold energy storage level. In other implementations, the device generates the energy request data 116 in response to a determination that the device has an insufficient amount of stored energy to complete an operation. For example, where the device includes surveillance equipment, the surveillance equipment may determine that the energy level is an insufficient amount of energy to perform surveillance for the next 25 hours. In some implementations, the device generates the energy request data 116 in response to a user placing an order for additional energy.

The device may determine that a first amount of energy associated with the device is equal to or less than a threshold amount. In some examples, the threshold amount occurs when the energy associated with the energy source 110 is less than full, less than half full, or less than a quarter full.

In one example, where the device comprises the vehicle 102, the vehicle 102 determines that the first amount of energy associated with the vehicle 102 is equal to or less than a threshold amount in response to a determination that the first amount of energy is insufficient to enable the vehicle 102 to move from a current location of the vehicle 102 to a recharging device location. The recharging device location may include locations such as a charging station at a commercial enterprise, a recharging unit located at the house of the vehicle's driver, a recharging unit located at a location of the driver's friend, and so forth. The vehicle 102 may determine that there is an insufficient amount of energy to convey the vehicle 102 to the charging device by analyzing the historical energy consumption data 114 and the vehicle location data 120.

At 1004, the device provides the energy request data 116 to the server 104. Although in this example the device provides the energy request data 116 to the server 104, in other examples, the device provides the energy request data 116 to the UAV 106.

At 1006, the device selects a first UAV 106 from a plurality of different UAVs 106. The selection of the first UAV 106 may be based on a variety of factors, such as the distance between the UAVs 106 and the vehicle 102, the cost of transferring energy, the amount of energy available, the type of energy available for transfer, and so forth.

At 1008, the device docks with the first UAV 106. The device may dock with the UAV 106 using any suitable mechanism such as the mechanisms illustrated in FIGS. 6 and 7. At 1010, the device receives the energy from the first UAV 106.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium, and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art, and it is intended that the present disclosure encompass such changes and modifications that fall within the scope of the appended claims.

What is claimed is:

1. A system comprising:
   a vehicle including a rechargeable battery and an optical target, wherein the vehicle is configured to:
   determine that an amount of energy in the rechargeable battery is equal to or less than a threshold amount, wherein the threshold amount represents an amount of energy needed for the vehicle to reach a designated destination;
   generate a request for energy; and
   provide the request to a server;

receive an uncrewed autonomous vehicle identification ("UAV ID") from the server, wherein the UAV ID is associated with an uncrewed autonomous vehicle ("UAV");

execute a first authentication using wireless communication between the vehicle and the UAV that includes determining that the UAV ID is included within a UAV ID datastore;

receive, from the UAV, a transfer of energy for the rechargeable battery of the vehicle;

the server configured to:
determine a speed of the vehicle;
determine docking speeds supported by a plurality of UAVs;
select the UAV based on correspondence between a docking speed supported by the UAV and the speed of the vehicle; and
provide control data to the UAV, the control data representing instructions for the UAV to transfer energy to the rechargeable battery at a rendezvous location;
confirm an amount of the energy received for the rechargeable battery; and the UAV includes an energy storage device and an optical scanner, wherein the UAV is configured to:
receive the control data from the server;
determine, using the wireless communication between the vehicle and the UAV, that the vehicle includes one or more components capable of receiving energy from the UAV;
travel to the rendezvous location;
locate the vehicle proximate to the rendezvous location;
read, using the optical scanner of the UAV, the optical target of the vehicle;
execute a second authentication of the vehicle based on the read of the optical target;
dock with the vehicle while the vehicle is in motion, wherein the dock includes establishment of wired communication between the vehicle and the UAV using one or more electrical conductors;
execute a third authentication using the wired communication between the vehicle and the UAV that includes determining that a vehicle identification ("ID") is included within a vehicle ID datastore; and
transfer, using the energy storage device of the UAV, energy to the rechargeable battery of the vehicle.

2. The system of claim 1, wherein:
the UAV is configured to couple to the vehicle using the one or more electrical conductors when docked;
the vehicle is configured to provide heartbeat signals to the UAV using the one or more electrical conductors; and
the UAV is configured to determine a quantity of energy transferred to the rechargeable battery of the vehicle based on receiving a predetermined number of the heartbeat signals from the vehicle.

3. The system of claim 1, wherein:
the UAV includes:
a first UAV connector that includes a first upper side, a first lower side, and a first contact; and
a second UAV connector that includes a second upper side, a second lower side, and a second contact; and
the vehicle includes a docking mechanism including:
a first base portion and a first vehicle clamp engaged with the first base portion, wherein the first vehicle clamp is configured to move between a first open position and a first closed position to attach to the first contact, wherein the first vehicle clamp is connected to the rechargeable battery, and wherein in the first closed position, the first base portion contacts the first lower side and restricts movement of the first UAV connector toward the vehicle and the first vehicle clamp encloses the first upper side and restricts movement of the first UAV connector away from the vehicle; and
a second base portion and a second vehicle clamp engaged with the second base portion, wherein the second vehicle clamp is configured to move between a second open position and a second closed position to attach to the second contact, wherein the second vehicle clamp is connected to the rechargeable battery, and wherein in the second closed position, the second base portion contacts the second lower side and restricts movement of the second UAV connector toward the vehicle and the second vehicle clamp encloses the second upper side and restricts movement of the second UAV connector away from the vehicle.

4. An uncrewed autonomous vehicle ("UAV") comprising:
an energy storage device configured to store energy;
a communication interface;
a memory storing computer-executable instructions; and
a processor in communication with the communication interface and the memory,
the processor configured to execute the computer-executable instructions to:
receive, using the communication interface, an instruction to transfer energy between the energy storage device and a vehicle, wherein the vehicle is proximate to a rendezvous location;
execute a first authentication process to authenticate one or more of the vehicle or the UAV using wireless communication, wherein the first authentication process determines correspondence between a speed of the vehicle and a docking speed supported by the UAV;
navigate the UAV to the rendezvous location;
determine location and motion information associated with the vehicle;
execute a second authentication process by detecting an optical target on the vehicle;
dock with the vehicle, wherein the dock includes establishment of a wired connection between the vehicle and the UAV using one or more of electrical conductors;
execute a third authentication process to authenticate the vehicle using the wired connection between the vehicle and the UAV; and
responsive to success with the first, second, and third authentication process, transfer at least one of:
a portion of the energy stored in the energy storage device to the vehicle; or
a portion of energy stored in the vehicle to the energy storage device.

5. The UAV of claim 4, wherein the optical target includes a machine-readable optical code attached to the vehicle and the processor is configured to execute the computer-executable instructions to:
execute the second authentication process by:
acquiring, using an optical scanner, vehicle identification information from the machine-readable optical code; and
querying a datastore storing a plurality of vehicle identification information to determine that the acquired vehicle identification information is included within the datastore.

6. The UAV of claim 4, wherein:
the optical target includes one or more lights configured to generate one or more of an optical pattern, an optical shape, or an optical sequence; and
the processor is configured to execute the computer-executable instructions to authenticate the vehicle by determining that the one or more of the optical pattern, the optical shape, or the optical sequence corresponds to a predetermined optical target.

7. The UAV of claim 4, wherein the processor is configured to execute the computer-executable instructions to:
receive vehicle location data from the vehicle, the vehicle location data indicating an expected route of the vehicle;
receive movement data indicative of a speed of the vehicle;
generate UAV location data indicating a location of the UAV; and
determine the rendezvous location using the vehicle location data, the movement data, and the UAV location data.

8. The UAV of claim 4, wherein the processor is configured to execute the computer-executable instructions to:
receive environment data from the vehicle, the environment data comprising information indicating an existence of objects proximate to the vehicle; and
navigate the UAV to avoid the objects while docking the UAV to the vehicle.

9. The UAV of claim 4, wherein the processor is configured to execute the computer-executable instructions to:
receive vehicle movement data from the vehicle, the vehicle movement data indicative of the speed of the vehicle; and
determine one or more docking speeds supported by the UAV.

10. The UAV of claim 4, wherein:
the UAV is configured to connect to the vehicle using an electrical conductor associated with a docking mechanism comprising an elongate member, wherein the elongate member is parallel to and configured for receipt within a channel formed in a vehicle connector attached to the vehicle, wherein the channel encloses the elongate member to limit movement of the UAV toward or away from the vehicle, and wherein placement of the elongate member within the channel places the energy storage device of the UAV into electrical communication with the vehicle; and
transferring the portion of the energy to the vehicle includes transferring the energy from the energy storage device to the vehicle as a flow of electrical current using the electrical conductor, wherein the energy storage device remains with the UAV.

11. A method comprising:
generating, using a device, an energy request;
providing the energy request to a server configured to select a first uncrewed autonomous vehicle ("UAV"), wherein:
the first UAV is selected from a plurality of different UAVs; and
the first UAV includes energy for the device;
performing, before dispatch of the first UAV, a first authentication between the server and the first UAV using wireless communication;
performing a second authentication between the first UAV and the device using the wireless communication, wherein one or more of the first authentication or the second authentication includes determining correspondence between a speed of the device and a docking speed supported by the first UAV;
docking the device with the first UAV;
performing a third authentication between the first UAV and the device using a wired connection between the first UAV and the device; and
transferring energy between the device and the first UAV.

12. The method of claim 11, further comprising:
accessing recharging location data representative of a first location of a recharging apparatus, wherein the device comprises a vehicle;
accessing historical energy consumption data comprising information about an amount of energy consumed by the vehicle during one or more designated periods of time;
generating vehicle location data indicative of a second location of the vehicle at a current time; and
based on the historical energy consumption data, determining that an amount of energy is insufficient to enable the vehicle to move from the second location to the first location, wherein the energy request is generated responsive to the determining that the amount of energy is insufficient to enable the vehicle to move from the second location to the first location.

13. The UAV of claim 4, wherein the first authentication process, the second authentication process, and the third authentication process use one or more cryptographic keys.

14. The system of claim 1, wherein the vehicle further comprises a non-transitory computer-readable storage medium storing historical energy consumption data for the vehicle, the historical energy consumption data indicating information about quantities of energy consumed by the vehicle during one or more periods of time, and wherein the vehicle further configured to determine the threshold amount based on the historical energy consumption data and the designated destination.

15. The system of claim 1, wherein the optical target includes one or more of:
at least one light source configured to generate light having one or more of a pattern, a shape, or a sequence; or
machine-readable optical code attached to the vehicle; and
wherein the optical scanner of the UAV is configured to detect the one or more of the pattern, the shape, the sequence, or the machine-readable optical code.

16. The method of claim 11, further comprising detecting an optical target on the device using an optical scanner of the first UAV, wherein the optical target includes one or more of:
at least one light source configured to generate light having one or more of a pattern, a shape, or a sequence; or
machine-readable optical code attached to the device.

17. The method of claim 11, wherein docking the device with the first UAV includes:
positioning a lower side of a first UAV electrical contact of the first UAV in communication with a first base portion of the device, wherein the first base portion includes a first device electrical contact;
positioning a lower side of a second UAV electrical contact of the first UAV in communication with a second base portion of the device, wherein the second base portion includes a second device electrical contact;

moving a first clamp of the device, attached to the first base portion, from an open position to a closed position, wherein in the closed position, the first base portion limits movement of the first UAV toward the device and the first clamp encloses an upper side of the first UAV electrical contact and limits movement of the first UAV electrical contact of the first UAV away from the first device electrical contact of the device; and moving a second clamp of the device, attached to the second base portion, from an open position to a closed position, wherein in the closed position, the second base portion limits movement of the first UAV toward the device and the second clamp encloses an upper side of the second UAV electrical contact and limits movement of the second UAV electrical contact of the second UAV away from the second device electrical contact of the device.

18. The UAV of claim 4, further comprising computer-executable instructions to:

execute a fourth authentication process prior to docking with the vehicle, wherein the fourth authentication process includes providing information from the UAV to the vehicle to authenticate the UAV to the vehicle.

19. The UAV of claim 18, wherein providing the information from the UAV to the vehicle includes moving the UAV in a movement pattern for authentication by the vehicle.

20. The method of claim 11, wherein the correspondence between the speed of the device and the docking speed supported by the first UAV by:

determining the speed of the vehicle;

determine docking speeds supported by a plurality of UAVs; and determining that the first UAV supports a docking speed greater than or equal to a speed of the device.

* * * * *